United States Patent
Salem et al.

(10) Patent No.: US 11,483,884 B2
(45) Date of Patent: *Oct. 25, 2022

(54) SYSTEM AND METHOD FOR NETWORK-ASSISTED DISTRIBUTED USER EQUIPMENT COOPERATION IN UNLICENSED SPECTRUM

(71) Applicants: Mohamed Adel Salem, Kanata (CA); Amine Maaref, Ottawa (CA)

(72) Inventors: Mohamed Adel Salem, Kanata (CA); Amine Maaref, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 227 days.

This patent is subject to a terminal disclaimer.

(21) Appl. No.: 16/542,371

(22) Filed: Aug. 16, 2019

(65) Prior Publication Data

US 2020/0084812 A1 Mar. 12, 2020

Related U.S. Application Data

(63) Continuation of application No. 15/386,672, filed on Dec. 21, 2016, now Pat. No. 10,390,379.

(51) Int. Cl.
*H04L 1/18* (2006.01)
*H04W 16/14* (2009.01)
(Continued)

(52) U.S. Cl.
CPC .......... *H04W 76/14* (2018.02); *H04B 17/102* (2015.01); *H04L 1/1812* (2013.01);
(Continued)

(58) Field of Classification Search
CPC ....... H04W 4/06; H04W 16/14; H04W 52/08; H04W 72/121; H04W 74/08;
(Continued)

(56) References Cited

U.S. PATENT DOCUMENTS

| 8,902,907 B2 * | 12/2014 | Maaref ................. H04L 12/189 370/400 |
| 9,036,485 B2 | 5/2015 | Kang et al. |

(Continued)

FOREIGN PATENT DOCUMENTS

| CN | 101989868 A | 3/2011 |
| CN | 104662817 A | 5/2015 |

(Continued)

OTHER PUBLICATIONS

Huawei et al:"Sidelink Supportand Enhancements for NR", 3GPP DRAFT;R1-167207, vol. RAN wG1, No. Gothenburg, Sweden; Aug. 22, 2016-Aug. 26, 2016, Aug. 12, 2016, XP051142227, 8 pages.

(Continued)

*Primary Examiner* — Alpus Hsu

(57) ABSTRACT

Methods and devices are provided to enable a cooperating group of user equipments (UEs) to receive a group-specific common-parameters configuration (CPC) message over a first spectrum band and access a second spectrum band synchronously for device-to-device (D2D) sidelink transmission within the group. In an embodiment, a UE operating in a cooperation mode in a cooperating group of UEs receives a group-specific common-parameters configuration (CPC) message from a transmit point (TP) over a first spectrum band, the group-specific CPC message comprising information to configure cooperating UEs in the group for synchronous clear channel assessment (CCA) and aligned sidelink transmission starting times in a second spectrum band. The UE performs a synchronous CCA in the second spectrum band in accordance with a common contention window generated based on the information in the group-specific CPC message.

33 Claims, 9 Drawing Sheets

(51) Int. Cl.
  H04W 52/08 (2009.01)
  H04W 72/12 (2009.01)
  H04W 74/08 (2009.01)
  H04W 76/14 (2018.01)
  H04B 17/10 (2015.01)
  H04W 52/38 (2009.01)
  H04W 88/04 (2009.01)
  H04W 72/00 (2009.01)
(52) U.S. Cl.
  CPC ............ H04W 16/14 (2013.01); H04W 52/08 (2013.01); H04W 52/383 (2013.01); H04W 72/121 (2013.01); H04W 74/0808 (2013.01); H04L 1/1822 (2013.01); H04W 72/005 (2013.01); H04W 88/04 (2013.01)
(58) Field of Classification Search
  CPC ........... H04W 74/0816; H04W 76/023; H04W 76/14; H04W 88/04; H04L 1/1812; H04L 5/0055; H04L 12/189
  See application file for complete search history.

(56) References Cited

U.S. PATENT DOCUMENTS

| | | | |
|---|---|---|---|
| 9,253,785 | B2 | 2/2016 | Jalloul et al. |
| 9,313,043 | B2* | 4/2016 | De Campos Bartolomeu ............ H04W 74/0808 |
| 9,655,094 | B2* | 5/2017 | Maaref ............... H04W 72/121 |
| 10,237,890 | B2 | 3/2019 | Kim et al. |
| 10,285,117 | B2* | 5/2019 | Yoo ....................... H04W 16/14 |
| 10,292,158 | B2* | 5/2019 | Yerramalli ........... H04W 74/08 |
| 10,499,421 | B2* | 12/2019 | Luo .................... H04L 27/2613 |
| 10,687,358 | B2* | 6/2020 | Sadek ............... H04W 74/0816 |
| 2010/0297936 | A1 | 11/2010 | Nan |
| 2011/0034163 | A1 | 2/2011 | Zhu et al. |
| 2013/0331090 | A1 | 12/2013 | Kim et al. |
| 2014/0174094 | A1 | 6/2014 | Noh |
| 2014/0179293 | A1 | 6/2014 | Li et al. |
| 2015/0146680 | A1* | 5/2015 | Luo ..................... H04B 7/0626 370/330 |
| 2015/0163822 | A1 | 6/2015 | Guo et al. |
| 2015/0327297 | A1 | 11/2015 | Nilsson et al. |
| 2017/0215157 | A1 | 7/2017 | Yang |
| 2017/0215172 | A1 | 7/2017 | Yang |
| 2017/0215202 | A1 | 7/2017 | Yang |
| 2017/0238272 | A1 | 8/2017 | You et al. |
| 2017/0244571 | A1 | 8/2017 | Maaref et al. |
| 2017/0339530 | A1 | 11/2017 | Maaref et al. |
| 2018/0115991 | A1 | 4/2018 | Yang |
| 2018/0124834 | A1* | 5/2018 | Salem ................. H04W 74/006 |
| 2018/0310340 | A1* | 10/2018 | Noh ..................... H04L 5/0044 |

FOREIGN PATENT DOCUMENTS

| | | |
|---|---|---|
| CN | 104904298 A | 9/2015 |
| CN | 105580288 A | 5/2016 |
| CN | 105763308 A | 7/2016 |
| WO | 2014053102 A1 | 4/2014 |
| WO | 2015117567 A1 | 8/2015 |
| WO | 2015191963 A1 | 12/2015 |
| WO | 2016050175 A1 | 4/2016 |

OTHER PUBLICATIONS

Huawei Hisilicon [LGE]"WF an sidelink based UE cooperation in NR", 3GPP DRAFT;R1-168484 vol. RAN WG1, No. Gothenburg, Sweden; Aug. 28, 2016, XP051143922, 4 pages.

Huawei et al.,"Support for UE Cooperation in NR",3GPP TSG RAN WG1 Meeting #85 R1-164379, Nanjing, China, May 23-27, 2016, total 7 pages.

3GPP TS 36.213 V13.1.1 Release 13, "14 UE Procedures Related to Sidelink", Mar. 2016, pp. 334-352.

* cited by examiner

SYSTEM AND METHOD FOR NETWORK-ASSISTED DISTRIBUTED USER EQUIPMENT COOPERATION IN UNLICENSED SPECTRUM

CROSS-REFERENCE TO RELATED APPLICATION

This application is a continuation of U.S. patent application Ser. No. 15/386,672 entitled "System and Method for Network-Assisted Distributed User Equipment Cooperation in Unlicensed Spectrum" filed Dec. 21, 2016, now issued as U.S. Pat. No. 10,390,379, the entire content of which is incorporated herein by reference.

FIELD

The application relates to systems and methods of network-assisted distributed user equipment cooperation in unlicensed spectrum.

BACKGROUND

In a radio access network, a network may form a logical/virtual/hyper user equipment (UE) mesh entity, hereinafter Hyper UE, consisting of a group/cluster of UEs in close proximity, capable of sidelink device-to-device (D2D) short-range communications, to help boost coverage and spectral efficiency. UEs form a Hyper UE that acts as a single distributed virtual transceiver with respect to the network. The network communicates with the distributed virtual transceiver through a first access link air interface designed for uplink and/or downlink communications.

A Hyper UE consists of at least one target UE (TUE) and a set of cooperating UEs (CUEs). CUEs help TUEs communicate with the network, for example by receiving data on the downlink and/or transmitting data on the uplink using the access link air interface by acting as UE relays between the network and the TUEs.

SUMMARY

One aspect of the present disclosure provides a method in user equipment (UE). In the method, the UE operates in a cooperation mode, in which the UE acts a cooperating UE (CUE) in a cooperating group of UEs. In the cooperation mode, the UE receives a group-specific common-parameters configuration (CPC) message from a transmit point (TP) over a first spectrum band, the group-specific CPC message comprising information to configure cooperating UEs in the group for synchronous clear channel assessment (CCA) and aligned sidelink transmission starting times in a second spectrum band, and performs a synchronous CCA in the second spectrum band in accordance with a common contention window generated based on the information in the group-specific CPC message.

In some embodiments, the first spectrum band is a licensed spectrum band and the second spectrum band is an unlicensed spectrum band.

Optionally, the information to configure cooperating UEs in the group for synchronous CCA and aligned sidelink transmission starting times in the second spectrum band comprises a group-specific common seed value and the common contention window is generated using a random number generator initialized with the group-specific common seed value.

In some embodiments, the information to configure cooperating UEs in the group for synchronous CCA and aligned sidelink transmission starting times in the second spectrum band further comprises information indicating a priority class index associated with a traffic flow targeted to a target UE (TUE) of the group, the method further comprising determining a minimum contention window size, $CW_{min}$, and a maximum contention window size, $CW_{max}$, for the common contention window based on the priority class index.

Optionally, the information to configure cooperating UEs in the group for synchronous CCA and aligned sidelink transmission starting times in the second spectrum band further comprises information indicating a time offset, $T_{offset}$ and the common contention window is generated by:

determining a group listen-before-talk (LBT) initialization instant, $t_0$, by applying $T_{offset}$ from the time of the end of a transmission from the TP;

at the group LBT initialization instant, $t_0$, using the random number generator that was initialized with the common seed value to generate a new uniform random number from the set $\{0, 1, \ldots, CW_{min}\}$ and setting a value of a backoff counter equal to the new uniform random number; and setting the size of the common contention window based on the value of the backoff counter and a CCA slot duration.

Optionally, operating in the cooperation mode further comprises determining an earliest start time, $t_s$, for a sidelink transmission over the second spectrum band based on the common CCA initialization instant, $t_0$.

In some embodiments, to align the sidelink transmission over the second spectrum band with a transmission time unit (TTU) in the first spectrum band, the earliest start time, $t_s$, is determined according to: $t_s$=floor$[(t_0+DIFS+CW_{cs}+T_s)/T_s]$ *$T_s$, or $t_s$=ceil$[(t_0+DIFS+CW_{cs})/T_s]$ *$T_s$, where floor[ ] is the floor function, ceil[ ] is the ceiling function, $t_0$ is the common CCA initialization instant, DIFS is a Distributed Coordination Function Inter-Frame Space, $CW_{cs}$ is the size of the common contention window, and $T_s$ is the duration of a TTU in the first spectrum band.

Optionally, performing a synchronous CCA in the second spectrum band in accordance with the common contention window comprises starting the synchronous CCA at a time $t_{CCA}$ according to: $t_{CCA}=t_s-(DIFS+CW_{cs})$, where $t_s$ is the earliest start time for a sidelink transmission over the second spectrum band, DIFS is a Distributed Coordination Function Inter-Frame Space, and $CW_{cs}$ is the size of the common contention window.

Optionally, in response to receiving a multi-cast message from the TUE indicating an end to sidelink transmission to the TUE, the UE determines a new group LBT initialization instant, $t_0$, as the time of the end of the multi-cast message from the TUE indicating an end to sidelink transmission to the TUE, at the new group LBT initialization instant, $t_0$, uses the random number generator that was initialized with the common seed value to generate a new uniform random number from the set $\{0, 1, \ldots, CW_{min}\}$ and sets a value of the backoff counter equal to the new uniform random number, and then sets the size of the common contention window based on the value of the backoff counter and the CCA slot duration.

Optionally, in response to receiving a multi-cast message from the TUE indicating an end to sidelink transmission to the TUE followed by a multi-cast message from the TUE comprising closed-loop power control (CLPC) information for the UE, the UE determines a new group LBT initialization instant, $t_0$, as the time of the end of the multi-cast message from the TUE comprising CLPC information for the UE, at the new group LBT initialization instant, $t_0$, uses the random number generator that was initialized with the common seed value to generate a new uniform random number from the set $\{0, 1, \ldots, CW_{min}\}$ and sets a value of the backoff counter equal to the new uniform random number, and then sets the size of the common contention window based on the value of the backoff counter and the CCA slot duration.

Optionally, in response to a sidelink timeout interval, $T_{SL-timeout}$, expiring without receiving a message from the TUE indicating an end to sidelink transmission to the TUE, the UE determines a new group LBT initialization instant, $t_0$, as the time of the expiry of the sidelink timeout interval, $T_{SL-timeout}$, at the new group LBT initialization instant, $t_0$, uses the random number generator that was initialized with the common seed value to generate a new uniform random number from the set $\{0, 1, \ldots, CW\}$, where CW is greater than $CW_{min}$, and sets a value of the backoff counter equal to the new uniform random number, and then sets the size of the common contention window based on the value of the backoff counter and the CCA slot duration.

In some embodiments, the UE operates in a target mode, in which the UE acts as a target UE (TUE) in a cooperating group of UEs that includes the TUE and at least one cooperating UE (CUE). In the target mode, in response to detecting an end of the last of at least one sidelink transmission from the at least one CUE over the second spectrum band, the UE multi-casts a message over the second spectrum band to the group, the message indicating an end to sidelink transmission to the TUE.

In some embodiments, the UE operating in the target mode also multi-casts closed-loop power control (CLPC) information for the at least one CUE. For example, in some embodiments the CLPC information is multi-cast by the UE in response to receiving, over the second spectrum band, at least one sidelink transmission associated with a given hybrid automatic repeat request (HARQ) process identifier (ID), the CLPC information for the at least one CUE comprising, for each CUE that is assisting with the given HARQ process ID and from which a sidelink transmission was not received, a dynamic CLPC command to decrease the CUE's transmit power.

Another aspect of the present disclosure provides a user equipment (UE) configured to perform the method according to the above aspect of the present disclosure. For example, such a UE may include a wireless interface, a processor operatively coupled to the wireless interface, and a computer readable storage medium operatively coupled to the processor, the computer readable storage medium storing programming for execution by the processor that includes instructions for operating in the cooperation mode and/or the target mode according to the above aspect of the present disclosure.

DETAILED DESCRIPTION

Figure 1:
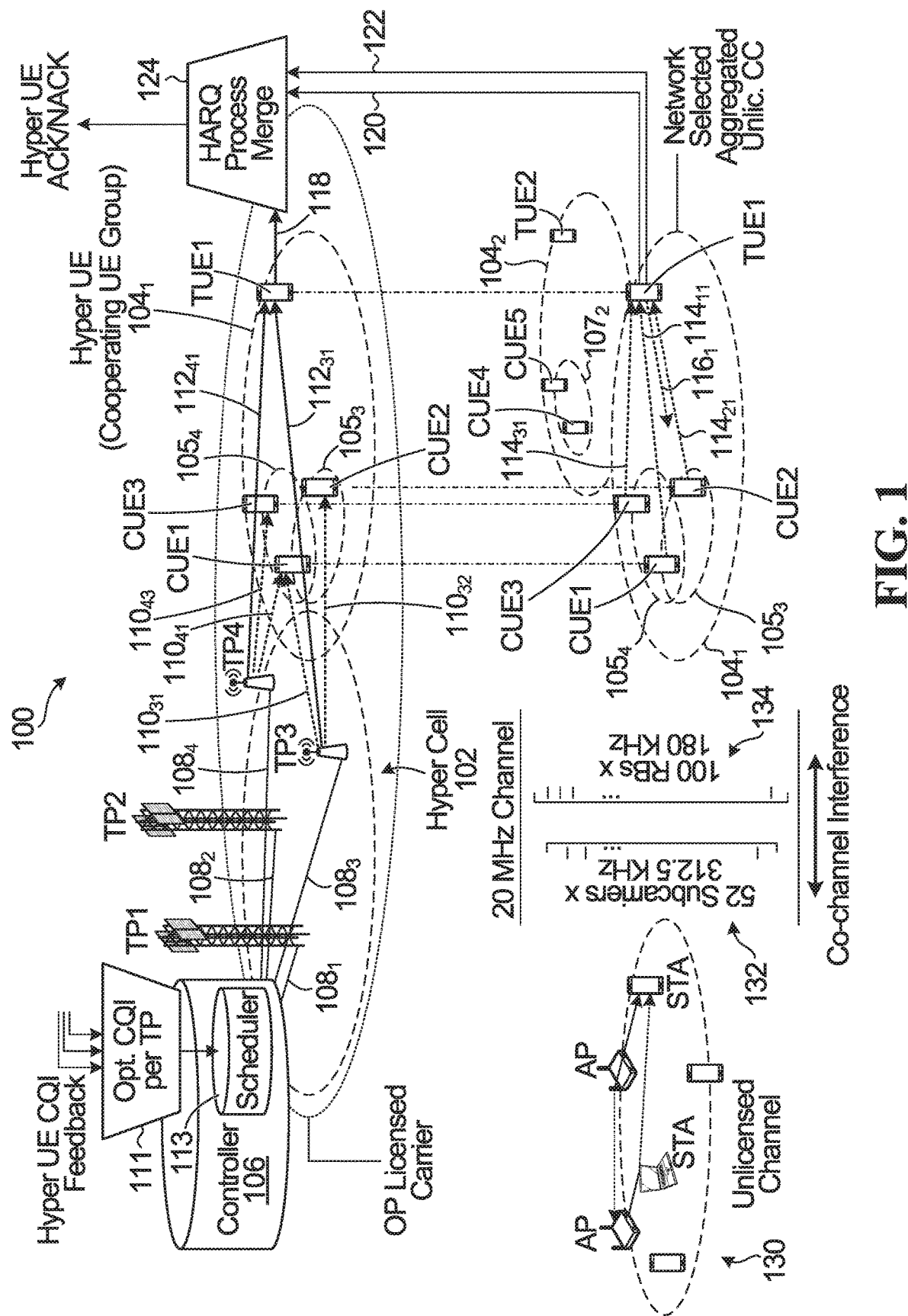
FIG. 1 is a block diagram of a network containing a cooperating UE group in accordance with an embodiment of the present disclosure.

Generally, embodiments of the present disclosure provide a method and system for network-assisted distributed UE cooperation in unlicensed spectrum. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Leveraging the presence of many idle/active UEs in the vicinity of an active target UE (TUE), network-assisted UE cooperation has been proven to be an efficient solution to increase throughput and/or coverage of mobile broadband (MBB) networks.

Cost-efficiency of UE cooperation makes it a very attractive solution to MBB operators because the device-to-device (D2D) communications between the cooperating UEs (CUEs) and the TUE can be established without additional investments in the network's infrastructure, resulting in savings in capital expenditure (CAPEX).

Due to the proximity of cooperating UEs, and in the interest of reducing the impact on their battery life, low transmit power is typically used for D2D sidelink (SL) transmissions compared to the transmit powers that may be used for access links in the licensed spectrum. As such, out-of-band D2D communications can provide a low-complexity approach to SL transmissions that avoids strong interference from the network's infrastructure nodes that are operating in-band in the licensed spectrum.

Given the scarcity and expense of bandwidth in the licensed spectrum, exploiting the vast and free-of-charge unlicensed spectrum to carry the out-of-band D2D communications is an approach that has garnered interest from MBB operators. For example, there has been significant interest in the unlicensed 5 GHz spectrum in which many Wireless Local Area Networks (WLANs) operate. Accordingly, in order to operate in this spectrum, efficient and fair coexistence with WLANs along with compliance with region-specific unlicensed spectrum regulations may be necessary for a successful UE Cooperation mechanism in the unlicensed spectrum.

In network-assisted UE cooperation, the network can select for each TUE the best CUEs per potential serving transmit point (TP), optimize channel quality indicator (CQI) feedback across the selected CUEs and the TUE links, and configure the group comprising the TUE and its selected CUEs to communicate on an unlicensed channel as an aggregated component carrier (CC). However, distributed dynamic operation/medium access of individual UEs in the Hyper UE may avoid excessive latency, complexity, and signalling overheads.

When a D2D communication among the UEs of a Hyper UE takes place in the unlicensed spectrum, each individual UE performs a listen-before-talk (LBT) operation (for example including initial clear channel assessment (ICCA) and possibly extended clear channel assessment (ECCA)) before accessing the unlicensed spectrum in order to check that the channel is idle before transmitting.

In regions such as Europe and Japan, devices attempting to access the unlicensed spectrum have to comply with either a Load Based Equipment (LBE) LBT procedure or a Frame Based Equipment (FBE) LBT procedure.

In the LBE LBT procedure, a device attempting to access the unlicensed spectrum can start transmitting at an arbitrary time after a successful CCA. The CCA mechanism employed in such LBE LBT procedures may be the same CCA mechanism employed in WLAN, i.e. carrier sense multiple access with collision avoidance (CSMA/CA), or it may be based on an energy-detection (ED)-based CCA. For example, an ED-based CCA may utilize a random backoff to determine the size of a contention window and a respective maximum channel occupancy (MCO) that determines the maximum amount of time for which a device may transmit in the unlicensed spectrum once it has successfully contended for a transmission opportunity.

In the FBE LBT procedure, a device attempting to access the unlicensed spectrum can start transmitting only at periodic instants after a short successful ED-based CCA.

If every individual UE in a Hyper UE accessed the unlicensed spectrum individually, it would create delay and would deteriorate UE cooperation performance at least in terms of the delay for all individual devices to perform their own LBT operation. If CUEs perform independent LBT procedures, they may either start forwarding data or send a reservation signal to ensure that other devices do not occupy the channel before they are able to transmit. In both situations, if no coordination exists between CUEs in terms of aligning their CCA periods, sending of the reservation signals or starting of the data forwarding to the TUEs, then the channel may appear to be busy for the other CUEs within the group, which in turn will reduce the efficiency and increase the latency of UE cooperation.

For example, in the CSMA/CA LBT procedure utilized in WiFi/WLAN, each device (e.g. WiFi access point (AP) or WiFi station (STA)) attempting to access the unlicensed spectrum independently generates a random backoff counter or contention window (CW) that is used to determine the length of an extended CCA (ECCA) that is performed after an initial CCA (ICCA) that is performed during a distributed coordination function inter-frame space (DIFS). In the CSMA/CA LBT procedure, if a CCA is terminated due to a 'busy' assessment, the backoff counter is frozen to maintain priority in the next access attempt. WiFi/WLAN APs or STAs of the same basic serving set (BSS) can block each other, because there is no synchronous group access in the CSMA/CA LBT procedure utilized in WiFi/WLAN. For a transmission from a source device to a destination device in WiFi/WLAN, if the source device successfully receives one or multiple medium access control protocol data units (MPDUs), e.g., an aggregated MPDU (AMPDU), an acknowledgement (ACK) signal is sent using a reliable modulation and coding scheme (MCS) from the destination device to the source device only. A time out for the transmission is detected by the source device if the source device does not receive/decode an ACK within a time frame defined by the duration of a short inter-frame space (SIFS) plus the duration of the ACK after the source device finishes the transmission.

The 3rd Generation Partnership Project (3GPP) Release 13 Long Term Evolution (LTE) specification provides a framework for Licensed Assisted Access (LAA) in unlicensed spectrum. The framework includes a Category 4 (CAT4) LBT procedure (LBT with random backoff or ECCA) that each device attempting to access the unlicensed spectrum must comply with. Similar to the LBT mechanism in CSMA/CA for WIFI/WLAN, in the 3GPP Release 13 CAT4 LBT mechanism each device independently generates a random backoff counter or contention window (CW), and if a CCA is terminated due to a 'busy' assessment, the backoff counter is frozen to maintain priority in the next access attempt. However, synchronous group access of neighboring small cell evolved Node Bs (eNBs) is supported in 3GPP Release 13 via backhaul connections by setting a common subframe start time for downlink (DL) transmissions from neighboring small cell eNBs. The eNB that finishes a successful CCA before the preset subframe starting point has to defer its transmission to that point. However, the eNB that has deferred its transmission cannot prevent WiFi or other LAA access during the defer time by transmitting a blank blocking/reservation signal because this will likely cause the ongoing CCAs of in-group eNBs to fail.

Systems and methods for network-assisted distributed UE cooperation in unlicensed spectrum are provided that may mitigate one or more of the disadvantages of the approaches described above. In some embodiments, UEs in the same Hyper UE synchronize their LBT procedure in order to be able to access the unlicensed spectrum simultaneously.

FIG. 1 depicts an example of how UEs in close proximity can be grouped into Hyper UEs (cooperation groups) that behave as distributed transceivers, and perform coordinated contention procedures with respect to the network, in accordance with an embodiment of the invention. Shown in FIG. 1 is a portion of a network 100 that includes a Hyper Cell (group of cooperating transmit points (TPs)) 102, a Hyper UE $104_1$ and a network controller 106. Hyper Cell 102 includes four transmit points TP1, TP2, TP3 and TP4, each having a respective backhaul connection $108_1$, $108_2$, $108_3$, $108_4$ to controller 106. Hyper UE $104_1$ includes four UEs CUE1, CUE2, CUE3, and TUE1. TUE1 is the intended destination of signals transmitted from the network TPs, e.g. TP3 and TP4, towards the Hyper UE $104_1$. CUE1, CUE2 and CUE3 are CUEs that help TUE1 in communicating with the network using D2D sidelinks for short-range communications within the Hyper UE $104_1$. In doing so, the CUEs effectively act as Network-to-UE relays towards TUE1. Information sent or relayed by CUEs to TUEs depends on the cooperation strategy, e.g. amplify-and-forward (AF), decode-and-forward (DF), compress-and-forward (CF), (frequency-selective) soft-forwarding (SF), joint reception (JR). CUE1, CUE2 and CUE3 may have been selected from the set of active or idle devices within the neighborhood of TUE1.

In some embodiments, before forming the Hyper UE (UE cooperation group) $104_1$, network controller 106 polls, via TPs TP1, TP2, TP3 and/or TP4, candidate CUEs to feedback their nominal decoding delays (NDDs). For example, network controller 106 may transmit a message over at least one of the backhaul connections $108_1$, $108_2$, $108_3$, $108_4$ to at least one of the TPs TP1, TP2, TP3, TP4 to cause the TP to transmit a polling message, over the licensed band, to candidate CUEs, the polling message requesting the NDD feedback. For example, as shown in FIG. 1, TP3 may transmit a polling message to CUE1 and CUE2 over licensed access links $110_{31}$ and $110_{32}$, respectively, and TP4 may transmit a polling message to CUE1 and CUE3 over licensed access links $110_{41}$ and $110_{43}$, respectively. In some embodiments, the polling message is transmitted within a DL control transmission. In some embodiments, the polling message is transmitted within a DL data transmission.

In some embodiments, network controller 106 forms the Hyper UE based at least in part on the NDD feedback from candidate CUEs. For example, in some embodiments, network controller 106 forms the Hyper UE $104_1$ by grouping CUEs with similar NDDs in the same Hyper UE.

In some embodiments, network controller 106 selects the TP(s) to serve a TUE based on channel quality indicator (CQI) feedback from the TPs. For example, as shown in FIG. 1, network controller 106 includes a scheduler 113 that schedules the TPs to serve Hyper UE $104_1$ based on CQI feedback (shown generally at 111 in FIG. 1) from each of the TPs TP1, TP2, TP3, TP4 for each of the UEs in Hyper UE $104_1$. In particular, for each candidate TP, the scheduler 106 processes CQI feedback from the TUE and the TUE's best longer-term-selected CUEs with the given TP, e.g., a first subgroup $105_3$ for TP3 and a second subgroup $105_4$ for TP4. In FIG. 1, based on the CQI feedback, scheduler 106 has scheduled Hyper UE $104_1$ to be served by TP3 and TP4, respectively. Within Hyper UE $104_1$, the first subgroup $105_3$ served by TP3 includes CUE1 and CUE2 and the second subgroup $105_4$ served by TP4 includes CUE1 and CUE3. It is noted that in this example CUE1 is included in both subgroups $105_3$ and $105_4$. It is also noted that TUE1's CUEs, i.e. CUE1, CUE2, CUE3, could also be served by the network as TUEs on licensed orthogonal or semi-orthogonal resources.

In order to synchronize an LBT procedure among the CUEs in Hyper UE $104_1$, network controller 106 generates a Hyper UE-specific common-parameters configuration (CPC) message that includes information to configure CUEs in Hyper UE $104_1$, i.e., CUE1, CUE2, CUE3, to generate a common contention window for synchronous CCA in the unlicensed spectrum. As depicted in FIG. 1, scheduler 106 has scheduled CUEs of Hyper UE $104_1$ to be served by TP3 and TP4. As such, network controller 106 transmits the CPC message for Hyper UE $104_1$ to TP3 and TP4 over backhaul connections $108_3$ and $108_4$ for transmission by TP3 and TP4 to CUE1, CUE2, and CUE3 over the licensed spectrum. For example, the CPC message for Hyper UE $104_1$ can be transmitted by TP3 to CUE2 over licensed access link $110_{32}$, can be transmitted by TP4 to CUE3 over licensed access link $110_{43}$, and can be transmitted by TP3 and/or TP4 to CUE1 over licensed access link $110_{31}$ and/or $110_{41}$. In some embodiments, the CPC message is transmitted within a DL control signal over the licensed access links.

The Hyper UE-specific CPC message can be transmitted in a periodic or aperiodic semi-static manner. In some embodiments, the CPC message is assigned a message identifier (ID).

In some embodiments, the information to be used to generate a common contention window includes a Hyper UE-specific common seed value to initialize a random number generator used by each CUE in the Hyper UE for generating the common contention window. In some embodiments, the common seed value is a cooperating group identifier (ID) associated with the Hyper UE or a UE ID associated with TUE1.

In some embodiments, the CPC message further includes information indicating a time offset, $T_{offset}$, for the CUEs to apply from the end of a source TP's transmission to determine a group LBT initialization instant, $t_0$. In some embodiments, the time offset $T_{offset}$ is configured so that it is greater than a maximum NDD of the CUEs in the Hyper UE.

In some embodiments, the CPC message further includes information indicating a maximum number of device-to-device (D2D) sidelink (SL) retransmissions, $N_{SL-reTx}$, that are permitted in the unlicensed spectrum.

In some embodiments, the CPC message further includes information indicating a sidelink timeout interval, $T_{SL-timeout}$.

In some embodiments, traffic flows may be classified according to priority class indices. For example, a first traffic flow having a higher priority than a second traffic flow may be classified with a higher priority class index. In some embodiments, the Hyper UE-specific CPC message for Hyper UE 1041 further includes information indicating a priority class index associated with a traffic flow to be relayed to TUE1. In some embodiments, each priority class index is associated with a minimum contention window size $CW_{min}$ and a maximum contention widow size $CW_{max}$. As will be discussed later, in some embodiments $CW_{min}$ and $CW_{max}$ may be used in generating the synchronous LBT contention window. In such embodiments, CUEs may use the priority class index associated with a traffic flow to look up the $CW_{min}$ and $CW_{max}$ to use as part of generating the synchronous contention window for relaying the traffic flow to a TUE. In some cases, a default priority class index may be defined, and the default priority class index is assumed if the CPC message does not include information indicating the priority class index.

In some embodiments, CUE1, CUE2, CUE3 employ identical random number generator functions and initialize their respective random number generator functions with the common seed and the looked up $CW_{min}$ and $CW_{max}$ parameters corresponding to the priority class of the traffic flow to be relayed to TUE1.

Each of the UEs that is acting as a CUE for TUE1 in Hyper UE $104_1$, i.e., CUE1, CUE2, CUE3, receives the CPC message from its respective TP(s) over the licensed spectrum, generates a common contention window based on the information in the CPC message, and performs a synchronous CCA with the other CUEs in Hyper UE $104_1$ to contend for a transmission opportunity in the unlicensed spectrum in accordance with the common contention window. Examples of common contention window based synchronous CCA procedures in accordance with embodiments of the present disclosure are discussed later with reference to the signaling diagrams depicted in FIGS. 2A, 2B and 3.

In some embodiments, CUEs employ an energy-detection (ED) based CCA in which a channel is determined to be busy if the total energy detected in the channel is greater than a CCA threshold value. In some embodiments, the CCA threshold value for a given UE is upper bounded by a function of the transmit power of the UE. For example, in some regions, the upper bound of the CCA threshold has been regulated as follows:

$$CCA\ Threshold \geq -73\frac{dBm}{MHz} + (23 - \max TxEIRP)\ [dBm],$$

where max Tx EIRP is a UE's maximum transmit equivalent isotropically radiated power (EIRP). As a result, the higher the max Tx power and/or the antenna gain, the lower the CCA threshold that is allowed. As such, an unlicensed spectrum access opportunity may depend on the result of the transmit power control mechanism that is used for sidelink transmission.

If the CCA performed by a CUE that has traffic data to forward to a TUE indicates an unlicensed spectrum resource is idle/clear, the CUE transmits a SL burst to the TUE in the unlicensed spectrum resource. As depicted in FIG. 1, CUE1, CUE2 and CUE3 transmit SL bursts to TUE1 over unlicensed sidelinks $114_{11}$, $114_{21}$ and $114_{31}$, respectively. Forwarded traffic data originating from different sources can be either augmented in the payload, e.g. within a transport block (TB), or multiplexed in the frequency or time domains. For example, CUE1 is included in both subgroups $105_3$ and $105_4$, which means that CUE1 potentially forwards traffic data intended for TUE1 from both TP3 and TP4.

The individual UEs forming a Hyper UE may use a first air interface designed for an access link (uplink/downlink) to communicate with the network TPs over the first licensed spectrum band, and use a second air interface designed for D2D sidelink communications over a second unlicensed spectrum band. The access link and sidelink air interfaces may use the same radio access technology (RAT) such as LTE or future generation, e.g., 5G, new radio (NR) or they may use distinct RATs, e.g. the access link air interface may belong to 5G NR and the sidelink air interface may belong to LTE and vice versa. In another embodiment, the access link air interface may belong to LTE or 5G NR and the second air interface may belong to WiFi. In another embodiment, the access link and sidelink air interfaces have designs that are similar, harmonized and/or unified. Specifically, in some embodiments the UE is configured with an air interface that handles uplink, downlink and sidelink communications using licensed and unlicensed spectrum in a unified way. In some embodiments, the same RAT is employed for both network and sidelink communications, in licensed and unlicensed bands respectively. In some embodiments, this involves using different air interfaces of the same RAT for network/licensed and sidelink communications. In some cases, the transmit or receive chain is RAT specific and can accommodate different air interfaces for the sidelink and network link.

In response to detecting an end of the last of the sidelink transmissions $114_{11}$, $114_{21}$, $114_{31}$ from CUE1, CUE2, CUE3, TUE1 multi-casts a sidelink end (SL-End) message 116 to its CUEs, i.e., CUE1, CUE2 and CUE3, over the unlicensed spectrum. The multi-cast SL-End message 116 is transmitted by TUE1 as a response frame to indicate that sidelink transmission to TUE1 has ended for a given transmission opportunity. As discussed in further detail below with reference to FIG. 2A, CUE1, CUE2 and CUE3 may use the SL-End message to synchronize subsequent LBT procedures. In some embodiments, the SL-End message 116 is transmitted after a short inter-frame space (SIFS). The SIFS accounts for time that may be needed for the wireless air interface of the TUE to transition between receiving and transmitting and/or for the wireless air interface of serving CUE(s) to transition between transmitting and receiving. ACK/negative acknowledgement (NACK) information for the HARQ process 124 for a given transmission will only be available after TUE1's decoding delay. In general, this means that the ACK/NACK information for a given transmission is not available until after a maximum channel occupancy (MCO) in the unlicensed spectrum for the transmission has expired, and thus transmitting such ACK/NACK information will require an LBT process by TUE1.

The physical parameters of the SL-End signal may be commonly known to CUEs in the network, which means that potentially all CUEs in the network may be able to decode the SL-End signal depending on channel conditions. However, the multi-cast SL-End message is intended only for the in-group CUEs. As such, although CUEs in other Hyper UEs may be able decode the signal and extract the message, such out-of-group CUEs should ignore the message contents. In some embodiments the SL-End message may be encrypted with higher layer encryption so that out-of-group CUEs may be able to decode the SL-End signal but cannot decrypt the message due to the higher layer encryption. In some embodiments, the SL-End message is encoded with group-specific higher layer encoding so that out-of-group CUEs may be able to decode the SL-End signal but cannot decrypt the message due to the higher layer encoding.

In some embodiments, the SL-End message is transmitted using the most reliable modulation and coding scheme (MCS) level independent of sidelink channel quality. This is done in an effort to maximize the probability that the SL-End message will be successfully received/decoded by in-group CUEs.

In some embodiments, the SL-End message includes symbols transmitted at a reference power level to allow for sidelink measurements/sounding at CUEs. This can eliminate or at least reduce the need for regular transmission of sidelink CQI feedback from the TUE to each CUE. This may also allow for more accurate/frequent estimation of sidelink pathloss for sidelink Open Loop Power Control (SL-OLPC).

To enable SL Closed Loop Power Control (SL-CLPC), a multi-cast SL-CLPC message can be multi-cast by the TUE following the SL-End message. In some embodiments, the SL-CLPC message may be appended to SL-End message so that it directly follows the SL-End message. In other embodiments, there is some time, $T_{gap}$, between the end of the multi-cast SL-End message and the beginning of the multi-cast SL-CLPC message, where $T_{gap} \leq SIFS$. The SL-CLPC message may be transmitted using the most reliable MCS level independent of the sidelink channel quality. The SL-CLPC message may include dynamic PC commands from the TUE for each CUE. For example, in some embodiments, the SL-CLPC message includes, for each CUE, a dynamic CLPC command indicating a signed power offset to be applied to the transmit power of the CUE. Each dynamic CLPC command may be a code of at least two bits. Leveraging the proximity of cooperating UEs, unlike LTE's UL PC, more quantization levels may be dedicated to power decrement commands than power increment commands.

Table 1 below is an example of a two-bit CLPC command codebook with more power decrement commands than power increment commands that may be used in some embodiments.

TABLE 1

| | CLPC Command Code | | | |
|---|---|---|---|---|
| | 10 | 00 | 01 | 11 |
| Signed Power Offset | −1 dB | 0 dB | +1 dB | −3 dB |

With reference to FIG. 1, Table 2 below is an example of a format for a SL-CLPC message that may be transmitted by TUE1 in accordance with the CLPC command codes shown in Table 1.

TABLE 2

| | CUE ID | | | |
|---|---|---|---|---|
| | CUE1 | CUE2 | CUE3 | ... |
| CLPC Command Code | 01 | 11 | 00 | ... |

As noted above, in some cases the CCA threshold value for a given UE is upper bounded by a function of the transmit power of the UE. In such cases, CLPC can be viewed as a trade-off between a sidelink's signal to noise ratio (SNR) and medium access probability. In other words, CLPC can affect a UE's medium access opportunity. For instance, if a TUE receives at least one in-group SL transmission for a given HARQ process ID, the TUE may send a −3 dB PC command (e.g. CLPC command "11" according to Table 1) to the remaining CUEs assisting with the given HARQ process ID, causing those CUEs to reduce their transmit power by −3 dB. If the CUEs' CCA thresholds are upper bounded by their transmit powers, then reducing their transmit powers by −3 dB increases their CCA thresholds, and therefore increases their medium access probability for the next CCA.

In some embodiments, the unlicensed spectrum used for D2D sidelink transmissions may overlap with the spectrum in which other communications systems/networks operate. For example, with reference to FIG. 1, the unlicensed channel in which the sidelink transmissions $114_{11}$, $114_{21}$, $114_{31}$ are transmitted may overlap with the unlicensed 5 GHz spectrum in which WiFi/WLANs operate. For example, the sidelink transmissions $114_{11}$, $114_{21}$, $114_{31}$ may be transmitted within the same unlicensed 20 MHz channel within which the STAs and APs of a WLAN 130 communicate. In some embodiments, the sidelink transmissions $114_{11}$, $114_{21}$, $114_{31}$ may be transmitted within a 20 MHz channel organized into 100 resource blocks (RBs) each having a bandwidth of 180 kHz (generally indicated at 134 in FIG. 1), which may overlap with a 20 MHz channel organized into 52 subcarriers each having a bandwidth of 312.5 kHz (generally indicated at 132 in FIG. 1) within which the STAs and APs of a WLAN 130 communicate. Further examples of sidelink transmission formats and constraints are described later in the present disclosure.

A TUE may be within network coverage or outside coverage. In FIG. 1, TUE1 is shown as being within coverage of Hyper Cell 102. In particular, TUE1 is shown having licensed access links $112_{31}$ and $112_{41}$ with TPs TP3 and TP4, respectively. Depending on whether a TUE is within network coverage, the TUE may combine the information received from TPs over the licensed spectrum and/or from CUEs over the unlicensed spectrum, in order to decode transmissions intended for the TUE. For the in-coverage scenario, all signaling between the TP(s) and the TUE may be conveyed through the licensed access link(s) between the TP(s) and the TUE, whereas for the out-of-coverage case such signaling is conveyed through the unlicensed sidelinks between the CUE(s) and the TUE. As such, in some embodiments, a TUE may employ a Hybrid Automatic Repeat reQuest (HARQ) process that merges the HARQ transport blocks received over the licensed and unlicensed links as HARQ revisions. For example, as depicted in FIG. 1, TUE1 employs a HARQ process 124 that merges licensed HARQ revisions 118 for transmissions received over licensed access links $112_{31}$ and $112_{41}$, with unlicensed HARQ revisions 120 and 122 for unlicensed sidelink transmissions received from the two subgroups $105_3$ and $105_4$.

The Hyper Cell 102 may serve multiple Hyper UEs. For example, as depicted in FIG. 1, Hyper Cell 102 may also serve a second Hyper UE $104_2$ that includes CUE4, CUE5 and TUE2. CUE4 and CUE5 may be included in a subgroup $107_2$ served by TP2, for example. In FIG. 1, there is no overlap between the UEs that act as a CUE or TUE in Hyper UEs $104_1$ and $104_2$. In other embodiments, a UE may act as a CUE or TUE in multiple Hyper UEs. For example, a UE may act as a TUE in two Hyper UEs, where a first set of UEs having a first similar NDD act as CUEs for the TUE in a first of the two Hyper UEs, and another set of UEs having a second similar NDD that is different from the first similar NDD act as CUEs for the TUE in a second of the two Hyper UEs. As another example, in some embodiments, a UE may act as a CUE for a first TUE in a first Hyper UE and also act as a CUE for a second TUE in a second Hyper UE. In general, a UE could be part of one or more Hyper UE groups given that they operate in a different channel or CC. Also, a UE could be a TUE in one group and a CUE in another. It should also be noted that the UEs that are included in a Hyper UE, and their role within the Hyper UE, i.e. CUE or TUE, and the TPs in the Hyper Cell that serve the Hyper UE may change over time.

Figure 2A:
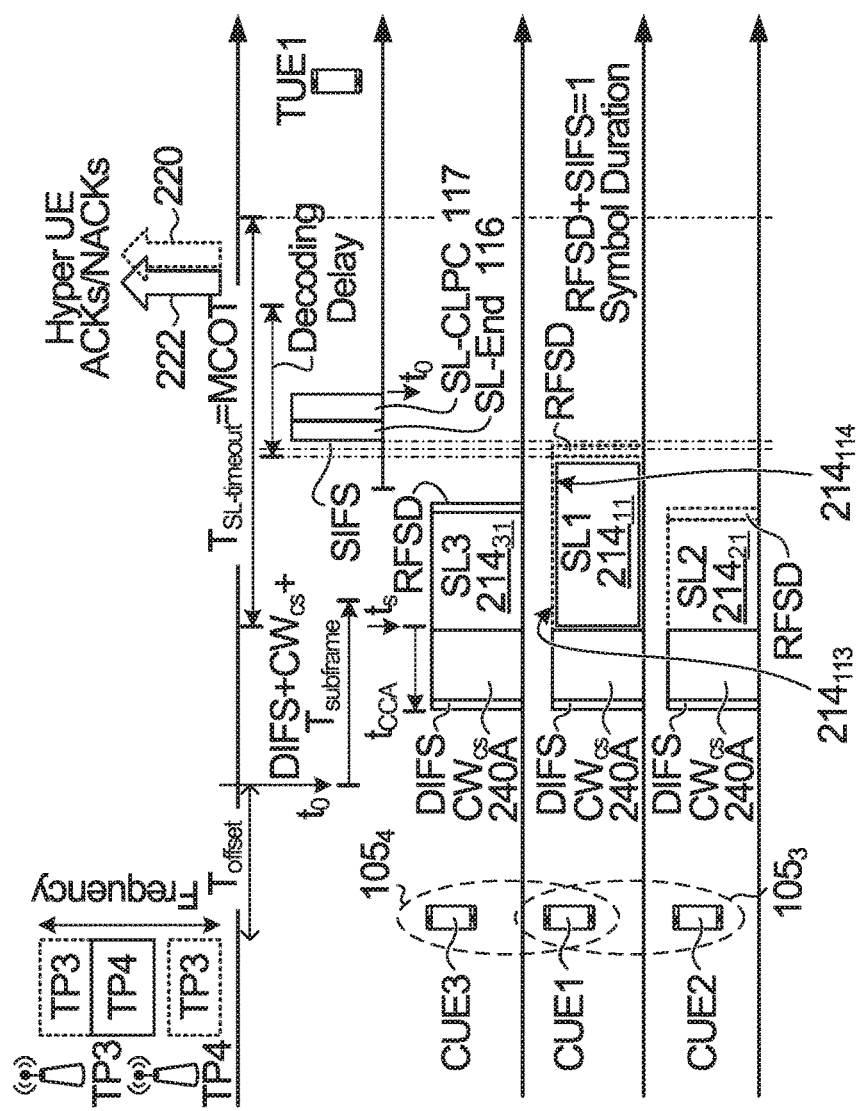
FIG. 2A is a timing diagram showing a first example of coordinated UE cooperation in accordance with an embodiment of the present disclosure.

FIG. 2A is a timing diagram for coordinated UE cooperation in the unlicensed spectrum in accordance with an embodiment of the present disclosure. In particular, FIG. 2A shows an example of operations performed by TP3, TP4, CUE1, CUE2, CUE3 and TUE1 from FIG. 1 for coordinated UE cooperation in the unlicensed spectrum within Hyper UE $104_1$.

As discussed above with reference to FIG. 1, the CUEs of Hyper UE $104_1$ include first and second subgroups of CUEs $105_3$ and $105_4$ served by TP3 and TP4, respectively. Subgroup $105_3$ includes CUE1 and CUE2. Subgroup $105_4$ includes CUE1 and CUE3. As depicted in FIG. 2A, transmissions from TP3 and TP4 over the licensed spectrum may be multiplexed in the frequency-domain. More generally, transmissions over the licensed spectrum may be multiplexed in one or more of the time-domain, the frequency-domain, or the code-domain, to name a few non-limiting examples.

As described above with reference to FIG. 1, each of the CUEs will have received a CPC message from its respective TP(s), the CPC message including information to configure the CUEs to generate a common contention window for synchronous CCA in the unlicensed spectrum. As described above, this information may include a common seed value for initializing a common random number generator function and a time offset, $T_{offset}$. The transmission of the CPC message to the CUEs has not been shown in FIG. 2A in order to simplify the Figure.

For initial sidelink access, upon successfully decoding at least one transport block (TB) intended for TUE1 (each TB having been transmitted by a respective TP over the licensed spectrum), each of CUE1, CUE2 and CUE3 uses the information that was previously received from the network in a Hyper UE-specific CPC message to generate a common contention window, CWs, for synchronous CCA in the unlicensed spectrum. In the example depicted in FIG. 2A, this involves:

initializing a random number generator with a common seed value that was included in the CPC message,
   determining a group LBT initialization instant, $t_0$, by applying $T_{offset}$ from the time of the end of a transmission from the TP,
   at the group LBT initialization instant, $t_0$, using the random number generator that was initialized with the common seed value to generate a new uniform random integer number from the set $\{0, 1, \ldots, CW_{min}\}$, where $CW_{min}$ is a minimum contention window size that may be determined based on a traffic priority class index associated with the traffic flow that is intended for TUE1, setting a value of a backoff counter equal to the new uniform random number, and setting the size of $CW_{cs}$ (generally indicated at 240A in FIG. 2A) based on the value of the backoff counter and a CCA slot duration, e.g., $CW_{cs}$=Backoff Counter*CCA-Slot-Duration, where $CW_{cs}$ is the size of the common-seed contention window, Backoff Counter is the value of the backoff counter and CCA-Slot-Duration is the value of the CCA slot duration.

In some embodiments, unlicensed sidelink transmissions are transmitted such that they are aligned with a transmission time unit (TTU) in the licensed spectrum. For example, in order to align unlicensed sidelink transmissions with the start of a TTU in the licensed spectrum, the earliest licensed band starting time, $t_s$, for unlicensed sidelink transmission may be calculated according to:

$$t_s=\text{floor}[(t_0+\text{DIFS}+CW_{cs}+T_s)/T_s]*T_s, \text{ or equivalently}$$

$$t_s=\text{ceil}[(t_0+\text{DIFS}+CW_{cs})/T_s]*T_s,$$

where floor[ ] is the floor function (rounding down) and ceil[ ] is the ceiling function (rounding up), to is the common CCA initialization instant, DIFS is a Distributed Coordination Function Inter-Frame Space, $CW_{cs}$ is the size of the common contention window, and $T_s$ is the duration of a TTU in the first spectrum band.

For subframe-level alignment, the earliest licensed band subframe starting time, $t_s$, for unlicensed sidelink transmission may be calculated by setting $T_s=T_{subframe}$, such that:

$$t_s=\text{floor}[(t_0+\text{DIFS}+CW_{cs}+T_{subframe})/T_{subframe}]*T_{subframe}, \text{ or equivalently}$$

$$t_s=\text{ceil}[(t_0+\text{DIFS}+CW_{cs})/T_{subframe}]*T_{subframe}.$$

Similarly, for symbol-level alignment, the earliest licensed band subframe starting time, $t_s$, for unlicensed sidelink transmission may be calculated by setting $T_s=T_{symbol}$, such that:

$$t_s=\text{floor}[(t_0+\text{DIFS}+CW_{cs}+T_{symbol})/T_{symbol}]*T_{symbol}, \text{ or equivalently}$$

$$t_s=\text{ceil}[(t_0+\text{DIFS}+CW_{cs})/T_{symbol}]*T_{symbol}.$$

If the unlicensed sidelink transmissions are not required to be aligned to any transmission time unit of the licensed spectrum resource grid, then the earliest starting time, $t_s$, for unlicensed sidelink transmission may be calculated according to:

$$t_s=t_0+\text{DIFS}+CW_{cs}$$

Once the earliest start time $t_s$ has been determined, each CUE starts the CCA process synchronously at a time $t_{CCA}$ according to:

$$t_{CCA}=t_s-(\text{DIFS}+CW_{cs})$$

No blank blocking signals or defer periods are required before sidelink transmission, which means that CUEs of the same Hyper UE will not affect each other's CCA.

If the synchronous CCA performed by a CUE indicates an unlicensed spectrum resource is idle/clear, the CUE transmits a SL burst to the TUE in the unlicensed spectrum resource. For example, as depicted in FIG. 2A, the synchronous CCA started by each of CUE1, CUE2 and CUE3 at $t_{CCA}$ concludes that the unlicensed spectrum channel is idle, and thus CUE1, CUE2 and CUE3 transmit sidelink bursts SL1 $214_{11}$, SL2 $214_{21}$ and SL3 $214_{31}$ respectively, starting at $t_s$. CUE2 is included in the first subgroup $105_3$ and is served by TP3, thus the sidelink burst SL2 $214_{21}$ transmitted by CUE2 includes traffic data intended for TUE1 that was received over the licensed spectrum from TP3. Similarly, CUE3 is included in the second subgroup $105_4$ and is served by TP4, thus the sidelink burst SL3 $214_{31}$ transmitted by CUE2 includes traffic data intended for TUE1 that was received over the licensed spectrum from TP4. CUE1 is included in both subgroups $105_3$ and $105_4$, which means that CUE1 potentially forwards traffic data intended for TUE1 from both TP3 and TP4. For example, as depicted in FIG. 2A, the sidelink burst SL1 $214_{11}$ transmitted by CUE1 includes first traffic data $214_{113}$ intended for TUE1 that was received over the licensed spectrum from TP3 and second traffic data $214_{114}$ intended for TUE1 that was received over the licensed spectrum from TP4.

In response to detecting an end of the last of the sidelink bursts SL1, SL2, SL3, TUE1 multi-casts the SL-End message 116 over the unlicensed spectrum after a short inter-frame space (SIFS) as a response frame to indicate that sidelink transmission to TUE1 has ended for the current transmission opportunity. As depicted in FIG. 2A, the sidelink burst SL1 $214_{11}$ transmitted by CUE1 ends last. As a result, the TUE's transmission of the SL-End message 116 starts after a SIFS following the RFSD at the end of the sidelink burst SL1 $214_{11}$.

In some embodiments, each CUE appends a Reserved Fractional Symbol Duration (RFSD) to its SL burst, where the RFSD is determined according to:

RFSD=1 Symbol Duration–SIFS, so that the transmission of the SL-End message 116 is aligned to the immediately following symbol start in the licensed spectrum resource grid.

As discussed above, in some embodiments, an SL-CLPC message 117 is multi-cast by the TUE following the SL-End message 116. For example, the SL-End message 117 may include symbols transmitted at a reference power level to allow for sidelink measurements/sounding at CUEs, and the SL-CLPC message may include a CLPC command for each CUE.

The SL burst, therefore, has a maximum length, in terms of symbol durations in the licensed spectrum, according to:

Max SL burst length=MCOT[symbols]–(1+SL-End+ SL-CLPC)[symbols], where MCOT is the maximum channel occupancy time in units of symbols, and SL-End and SL-CLPC are the lengths, in units of symbols, of the SL-End message 116 and the SL-CLPC message 117, respectively.

After transmitting the SL burst and the RFSD, each CUE waits to detect the multi-cast SL-End message 116.

In some embodiments, if a CUE does not detect the SL-End message 116 within a sidelink timeout interval, $T_{SL-timeout}$, where $T_{SL-timeout}$=MCOT:
the CUE attempts to repeat LBT with $t_0=t_s+T_{SL-timeout}$;
the contention window is doubled for collision avoidance, i.e., $CW=\min\{CW_{min}*2-1, CW_{max}\}$; and
a new random backoff counter is uniformly generated from the set $\{0, 1, \ldots, CW\}$ for a new $CW_{cs}$.

In some embodiments, if a CUE does detect the SL-End message 116 within the SL timeout interval:
the ending point of the SL-End message 116 marks the new to;
the contention window is reset to its original $CW_{min}$ value; and a new random backoff counter is uniformly generated from the set $\{0, 1, \ldots, CW_{min}\}$ for a new $CW_{cs}$ in the next CCA.

Hyper UE ACKs/NACKs for the current transmissions to TUE1 may be transmitted after TUE1's decoding delay.

Figure 2B:
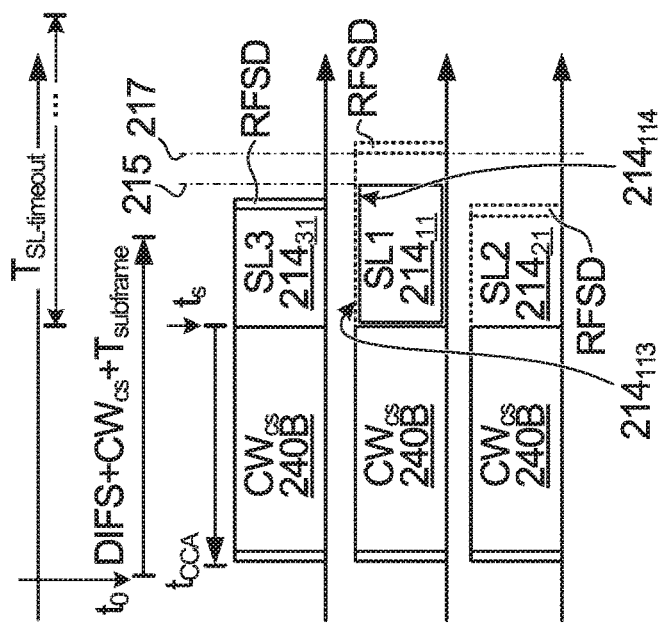
FIG. 2B is a timing diagram showing a second example of coordinated UE cooperation in accordance with an embodiment of the present disclosure.

FIG. 2A depicts a timing diagram for an example embodiment of the present disclosure in which the common contention window size is relatively short. FIG. 2B depicts a timing diagram for another example embodiment of the present disclosure in which the common contention window size is relatively longer. In addition, FIG. 2B depicts an example in which data originating from different sources span different durations in the same CUE's sidelink transmission.

Similar to FIG. 2A, in FIG. 2B each of the CUEs CUE1, CUE2 and CUE3 starts the CCA process synchronously at a time $t_{CCA}$ according to $t_{CCA}=t_s-(DIFS+CW_{cs})$, except that in FIG. 2B the $CW_{cs}$ 240B is longer than the $CW_{cs}$ 240A of FIG. 2A.

Here again, if the synchronous CCA started by each of CUE1, CUE2 and CUE3 at $t_{CCA}$ concludes that the unlicensed spectrum channel is idle, then CUE1, CUE2 and CUE3 transmit sidelink bursts SL1 $214_{11}$, SL2 $214_{21}$ and SL3 $214_{31}$ respectively, starting at $t_s$. In FIG. 2A, the data traffic $214_{113}$ originating from TP3 and the data traffic $214_{114}$ originating from TP4 have the same duration in the sidelink burst SL1 $214_{11}$ transmitted by CUE1. In contrast, in FIG. 2B, the data traffic $214_{113}$ originating from TP3 takes longer to transmit as part of the sidelink burst SL1 $214_{11}$ than the data traffic $214_{114}$ originating from TP4. In particular, as depicted in FIG. 2B, transmission of the data traffic $214_{114}$ originating from TP4 ends at a time generally indicated at 215, whereas transmission of the data traffic $214_{113}$ originating from TP3 is not complete until a later time generally indicated at 217.

Figure 3:
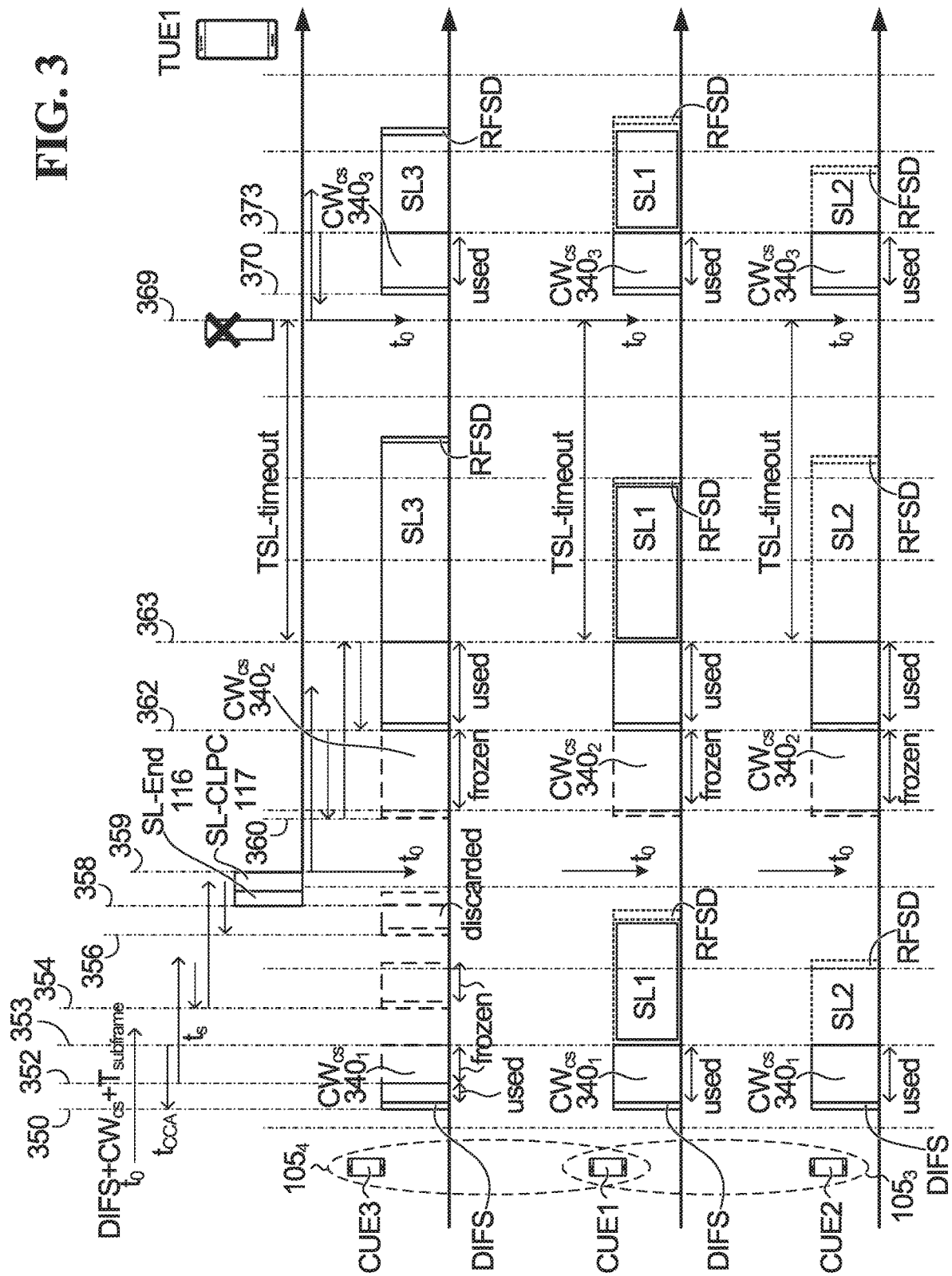
FIG. 3 is a timing diagram showing a third example of coordinated UE cooperation in accordance with an embodiment of the present disclosure.

In the timing diagrams depicted in FIGS. 2A and 2B, the synchronous CCA started by the CUEs have each concluded that the unlicensed spectrum channel is idle, and thus each CUE proceeds to transmit its respective sidelink burst. FIG. 3 depicts a timing diagram illustrating various scenarios where one or more of CUE1, CUE2 and/or CUE3 be interrupted during the CCA and/or have their CCA deferred after having concluded the unlicensed spectrum channel is busy.

Similar to FIGS. 2A and 2B, in FIG. 3 each of the CUEs CUE1, CUE2 and CUE3 starts the initial CCA process synchronously at a time $t_{CCA}$ according to $t_{CCA}=t_s-(DIFS+CW_{cs})$ using an initial common contention window $CW_{cs}$ $340_1$. In FIG. 3, the initial $t_{CCA}$ is generally indicated at 350. CUE1 and CUE2 complete their CCA process and conclude that the unlicensed spectrum channel is idle at 353. As a result, CUE1 and CUE2 transmit their sidelink bursts SL1 and SL2, respectively, at 353. However, at a point in time generally indicated at 352 within the initial contention window $CW_{cs}$ $340_1$, CUE3 finds that the unlicensed spectrum channel is busy/occupied.

A CUE that concludes the unlicensed spectrum channel is busy holds on transmitting its SL burst and freezes its backoff counter. The CUE then keeps redoing the CCA process (starting with the initial CCA during DIFS and decrementing the backoff counter during the extended CCA) until either:

the unlicensed spectrum channel is declared idle based on the CUE's CCA threshold, in which case the CUE proceeds with transmitting its SL burst, or the CUE detects the multi-cast SL-End message or the SL-End+CLPC messages that may be transmitted by the TUE after detecting the end of the last SL transmission of other in-group CUEs.

A CUE that is redoing the CCA process after having found the unlicensed spectrum channel to be busy may be unlikely to find unlicensed spectrum channel idle if transmission has already started on other in-group sidelinks. For example, when CUE finds the unlicensed spectrum channel to be busy at 352, it defers its CCA process to 354 by setting to equal to the time 352 at which CUE3 found the unlicensed spectrum channel to be busy and determining the deferred $t_{CCA}$ time 354 according to $t_{CCA}=t_s-(DIFS+CW_{CS})$, where $t_s=\text{floor}[(t_0+DIFS+CW_{cs}+T_{subframe})/T_{subframe}]*T_{subframe}$ or $t_s=\text{ceil}[(t_0+DIFS+CW_{cs})/T_{subframe}]*T_{subframe}$ (to provide subframe-alignment with the licensed spectrum resource grid) and $CW_{cs}$ is the remaining frozen portion of the initial contention window $CW_{cs}$ $340_1$. However, because CUE1 and CUE2 have already started transmitting their sidelink bursts at 352, when CUE3 attempts to redo its CCA process at 354 it again finds the unlicensed spectrum channel to be busy. CUE3 repeats this process by re-attempting its CCA at 356, where it again finds the unlicensed spectrum channel to be busy.

If a CUE detects the multi-cast SL-End message after transmitting its own SL burst or while attempting to redo its CCA process, the CUE discards the current contention window $CW_{cs}$. The ending point of the SL-End message, or the ending point of the SL-CLPC message if the SL-End message is followed by a SL-CLPC message, marks the new $t_0$. CW is reset to its original value, $CW_{min}$, and a new random backoff counter is uniformly generated from the set $\{0, 1, \ldots, CW_{min}\}$ for a new $CW_{cs}$. For example, when CUE3 detects the SL-End message 116 at 358 it discards its remaining frozen portion of the initial $CW_{cs}$ $340_1$, the ending point 359 of the SL-CLPC message 117 marks the new $t_0$, $CW_{min}$ is reset to its original value, and a new random backoff counter is uniformly generated from the set $\{0, 1, \ldots, CW_{min}\}$ for a new $CW_{cs}$ $340_2$. CUE1 and CUE2 used their initial contention windows $CW_{cs}$ $340_1$, so they do not have any remaining portion to discard, but they do mark the ending point 359 as the new to and generate a new random backoff counter for a new CWs $340_2$ as described above.

Using the new contention window $CW_{cs}$ $340_2$, each of the CUEs starts a new CCA process at 360, at which point they each find the unlicensed spectrum channel to be busy and defer the CCA process to 362. The defer time 362 to attempt to redo the CCA process is determined by setting to equal to the time 360 (the time at which each CUE found the unlicensed spectrum channel to be busy) and determining the deferred $t_{CCA}$ time 362 according to $t_{CCA}=t_s-(DIFS+CW_{cs})$, where $t_s=\text{floor}[(t_0+DIFS+CW_{cs}+T_{subframe})/T_{subframe}]*T_{subframe}$ or $t_s=\text{ceil}[(t_0+DIFS+CW_{cs})/T_{subframe}]*T_{subframe}$ (to provide subframe-alignment with the licensed spectrum resource grid) and $CW_{cs}$ is the remaining frozen portion of the current contention window CWs $340_2$.

CUE1, CUE2 and CUE3 all complete the CCA process that is started at 362 and conclude that the unlicensed spectrum channel is idle at 363. As a result, CUE1, CUE2 and CUE3 transmit their sidelink bursts SL1, SL2 and SL3, respectively, at 363. However, as shown in FIG. 3, following the start of the sidelink transmissions at 363, none of the CUEs detects an SL-End message before the sidelink timeout interval, $T_{SL\text{-}timeout}$, expires at 369. As a result, the expiry of $T_{SL\text{-}timeout}$ at 369 marks the new $t_0$, each CUE doubles the contention window for collision avoidance, i.e., $CW=\min\{CW_{min}*2-1, CW_{max}\}$, and a new random backoff counter is uniformly generated from the set $\{0, 1, \ldots, CW\}$ for a new $CW_{cs}$ $340_3$.

Using the new contention window $CW_{cs}$ 340₂, each of the CUEs starts a new CCA process at 370. CUE1, CUE2 and CUE3 all complete the CCA process that is started at 370 and conclude that the unlicensed spectrum channel is idle at 373. As a result, CUE1, CUE2 and CUE3 transmit their sidelink bursts SL1, SL2 and SL3, respectively, at 373.

Figure 4:
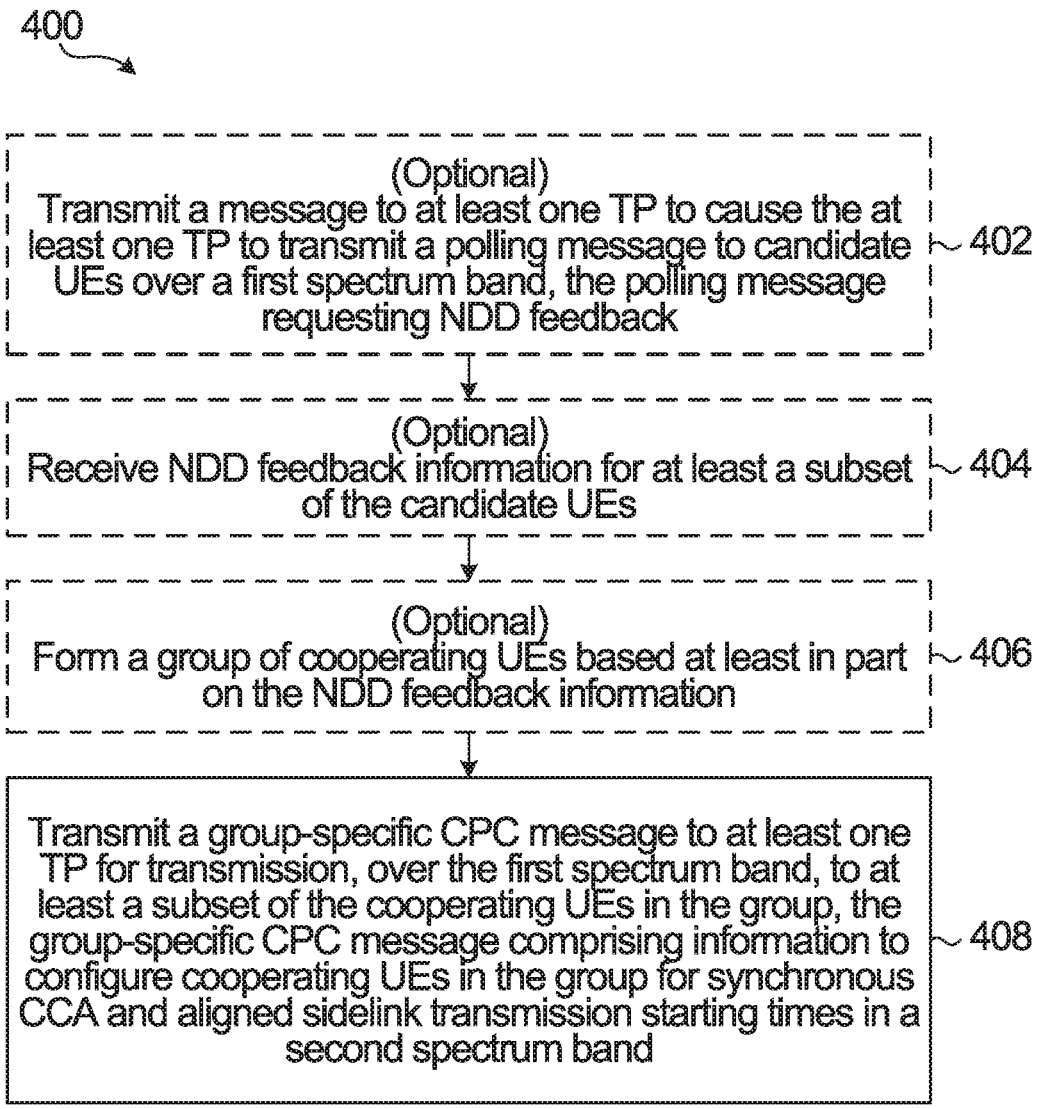
FIG. 4 is a flow diagram of examples operations in a network controller in accordance with an embodiment of the present disclosure.

FIG. 4 illustrates a flow diagram of example operations 400 in a network controller according to example embodiments described herein.

In block 402, the network controller transmits a message to at least one TP to cause the at least one TP to transmit a polling message to candidate UEs over a first spectrum band, the polling message requesting NDD feedback. This may involve, for example, transmitting the polling message to the TP(s) over respective backhaul connection(s) for transmission by the TP(s) to candidate UEs over a first licensed spectrum band.

In block 404, the network controller receives NDD feedback information for at least a subset of the candidate UEs. This may involve, for example, receiving the NDD feedback information from TP(s) over backhaul connection(s).

In block 406, the network controller forms a cooperating group of UEs based at least in part on the NDD feedback information. This may involve, for example, grouping UEs having similar nominal decoding delays. In some embodiments, the network controller forms a cooperating group of UEs by associating a group of candidate UEs with a group-specific ID.

In block 408, the network controller transmits a group-specific CPC message to at least one TP for transmission, over the first spectrum band, to at least a subset of the cooperating UEs in the group, the group-specific CPC message comprising information to configure cooperating UEs in the group to generate a common contention window for synchronous CCA and aligned sidelink transmission starting times in a second spectrum band. For example, the group-specific CPC message might include a group-specific common seed value to initialize a random number generator used by each cooperating UE in the group for generating the common contention window. The common seed value might be a cooperating group ID associated with the group or a UE ID associated with a UE that is designated as a TUE of the group, for example. In some embodiments, the CPC message also includes information indicating a time offset, $T_{offset}$, for the cooperating UEs to apply from the end of a source TP's transmission to determine a group LBT initialization instant, $t_0$. The time offset, $T_{offset}$, for a group may be selected so that it is greater than a maximum NDD of the cooperating UEs in the group that are selected to relay traffic from the source TP. The group-specific CPC message may also include further information regarding communication in the second spectrum band, such as information indicating a maximum number of D2D sidelink retransmissions, $N_{SL-reTx}$, in the second spectrum band and/or information indicating a priority class index associated with a traffic flow to be relayed to the TUE over the second spectrum band.

The example operations 400 are illustrative of an example embodiment. Various ways to perform the illustrated operations, as well as examples of other operations that may be performed, are described herein. Further variations may be or become apparent.

Figure 5:
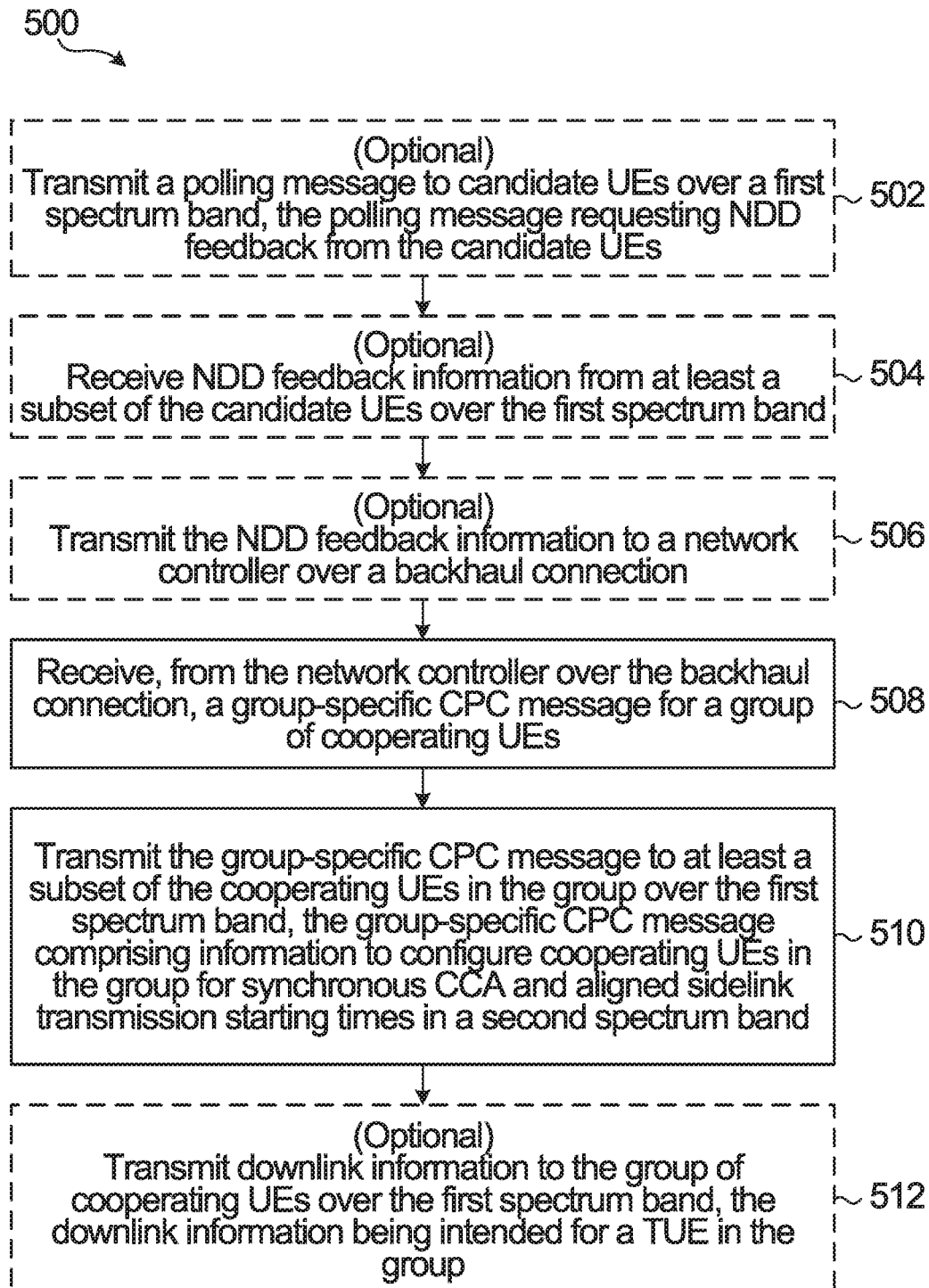
FIG. 5 is a flow diagram of examples operations in a transmit point in accordance with an embodiment of the present disclosure.

FIG. 5 illustrates a flow diagram of example operations 500 in a transmit point according to example embodiments described herein.

In block 502, the transmit point transmits a polling message to candidate UEs over a first spectrum band, the polling message requesting NDD feedback from the candidate UEs. This may involve, for example, multi-casting the polling message over a first licensed spectrum band.

In block 504, the transmit point receives NDD feedback information from at least a subset of the candidate UEs over the first spectrum band.

In block 506, the transmit point transmits the NDD feedback information to a network controller over a backhaul connection.

In block 508, the transmit point receives, from the network controller over the backhaul connection, a group-specific CPC message for a cooperating group of UEs.

In block 510, the transmit point transmits the group-specific CPC message to at least a subset of the cooperating UEs in the group over the first spectrum band, the group-specific CPC message comprising information to configure cooperating UEs in the group to generate a common contention window for synchronous CCA and aligned sidelink transmission starting times in a second spectrum band. The second spectrum band may be an unlicensed spectrum band. In some embodiments, the transmit point encodes the group-specific CPC message received from the network controller to generate an encoded group-specific CPC message and transmits the encoded group-specific CPC message over the first spectrum band. This may involve, for example, encoding the group-specific CPC message with a group-specific code. In some embodiments, the encoded group-specific CPC message is transmitted within a DL control or data transmission.

In some embodiments, the cooperating group of UEs includes a TUE and at least one CUE configured to relay traffic, received over the first spectrum band and intended for the TUE, to the TUE via D2D sidelink transmission in the second spectrum band.

The example operations 500 are illustrative of an example embodiment. Various ways to perform the illustrated operations, as well as examples of other operations that may be performed, are described herein. Further variations may be or become apparent.

Figure 6:
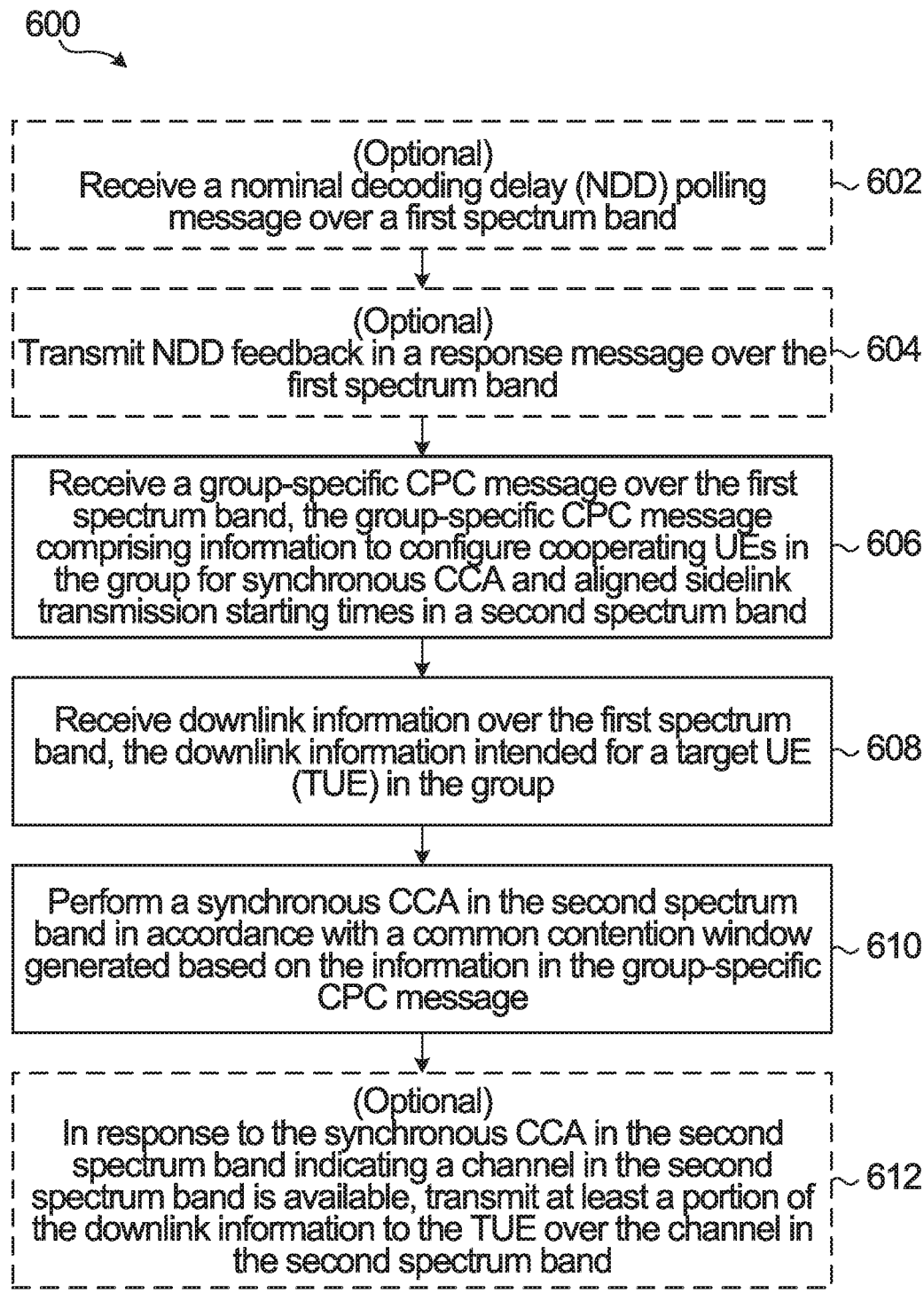
FIG. 6 is a flow diagram of examples operations in a UE operating as a CUE in a cooperating group of UEs in accordance with an embodiment of the present disclosure.

FIG. 6 illustrates a flow diagram of example operations 600 in a UE operating in a cooperating mode as a CUE in a cooperating group of UEs in accordance with an embodiment of the present disclosure.

In block 602, the CUE receives a NDD polling message over a first spectrum band.

In block 604, the CUE transmits NDD feedback in a response message over the first spectrum band.

In block 606, the CUE receives a group-specific CPC message over the first spectrum band, the group-specific CPC message comprising information to configure cooperating UEs in the group for synchronous CCA and aligned sidelink transmission starting times in a second spectrum band. The group-specific CPC message may include information such as a common seed value for a random number generator, a time offset, $T_{offset}$, a maximum number of D2D sidelink retransmissions, $N_{SL-reTx}$, in the second spectrum band and/or information indicating a priority class index associated with a traffic flow to be relayed to the TUE over the second spectrum band, as described previously.

In block 608, the CUE receives downlink information over the first spectrum band, the downlink information intended for a TUE in the cooperating group of UEs.

In block 610, the CUE performs a synchronous CCA in the second spectrum band in accordance with a common contention window generated based on the information in the group-specific CPC message received in block 606. Generating the common contention window may involve, for example, using a common seed value in the group-specific CPC message to initialize a random number generator used to generate the common contention window. This may further involve determining a minimum contention window length, $CW_{min}$, and a maximum contention window length, $CW_{max}$, for the common contention window based on priority class index information in the group-specific CPC message. Performing the synchronous CCA in the second spectrum band may involve, for example, performing an ED based CCA using an ED threshold based on transmit power of the UE. To synchronize the CCA with other UEs operating as CUEs in the cooperating group, the UE may determine a group LBT initialization instant, $t_0$, by applying $T_{offset}$ from the time of the end of a transmission from the TP and at the group LBT initialization instant, $t_0$, using the random number generator that was initialized with the common seed value to generate a new uniform random number from the set $\{0, 1, \ldots, CW_{min}\}$. The UE may then set a value of a backoff counter equal to the new uniform random number and set the size of the common contention window based on the value of the backoff counter and a CCA slot duration. This step may further involve determining an earliest start time, $t_s$, for a sidelink transmission over the second spectrum band based on the common CCA initialization instant, $t_0$. For example, to align the sidelink transmission over the second spectrum band with a TTU in the first spectrum band, the CUE may determine $t_s$ according to: $t_s = \text{floor}[(t_0 + \text{DIFS} + CW_{cs} + T_s)/T_s] * T_s$ or $t_s = \text{ceil}[(t_0 + \text{DIFS} + CW_{cs})/T_s] * T_s$, as described previously. The UE may then synchronously start the CCA at a time $t_{CCA}$ according to: $t_{CCA} = t_s - (\text{DIFS} + CW_{cs})$, as described previously.

In block 612, in response to the synchronous CCA in the second spectrum band indicating that a channel in the second spectrum band is available, the CUE transmits at least a portion of the downlink information to the TUE over the channel in the second spectrum band. For example, a sidelink air interface may be used by the CUE for transmission over the unlicensed spectrum during the current transmission opportunity.

In some embodiments, if, after having transmitted a sidelink transmission to the TUE, the CUE receives a message from the TUE indicating an end to sidelink transmission to the TUE, the UE then determines a new $t_0$ as the time of the end of the message from the TUE indicating an end to sidelink transmission to the TUE and determines a new common contention window for the next CCA, as described previously.

In some embodiments, the message from the TUE indicating an end to sidelink transmission to the TUE is followed by a CLPC message that includes CLPC information for the CUE. In such cases, the CUE determines the new $t_0$ as the time of the end of the CLPC message. In some embodiments, the CUE adjusts its transmit power based on the CLPC information received from the TUE.

In some embodiments, if a sidelink timeout interval, $T_{SL-timeout}$, expires without receiving a message from the TUE indicating an end to sidelink transmission to the TUE, the CUE determines a new $t_0$ as the time of the expiry of $T_{SL-timeout}$. At the new $t_0$ the CUE uses the random number generator that was initialized with the common seed value to generate a new uniform random number from the set $\{0, 1, \ldots, CW\}$, where CW is greater than $CW_{min}$, and sets a value of the backoff counter equal to the new uniform random number. The CUE then sets the size of the common contention window for the next CCA based on the value of the backoff counter and the CCA slot duration. In some embodiments, CW is double $CW_{min}$.

The example operations 600 are illustrative of an example embodiment. Various ways to perform the illustrated operations, as well as examples of other operations that may be performed, are described herein. Further variations may be or become apparent.

Figure 7:
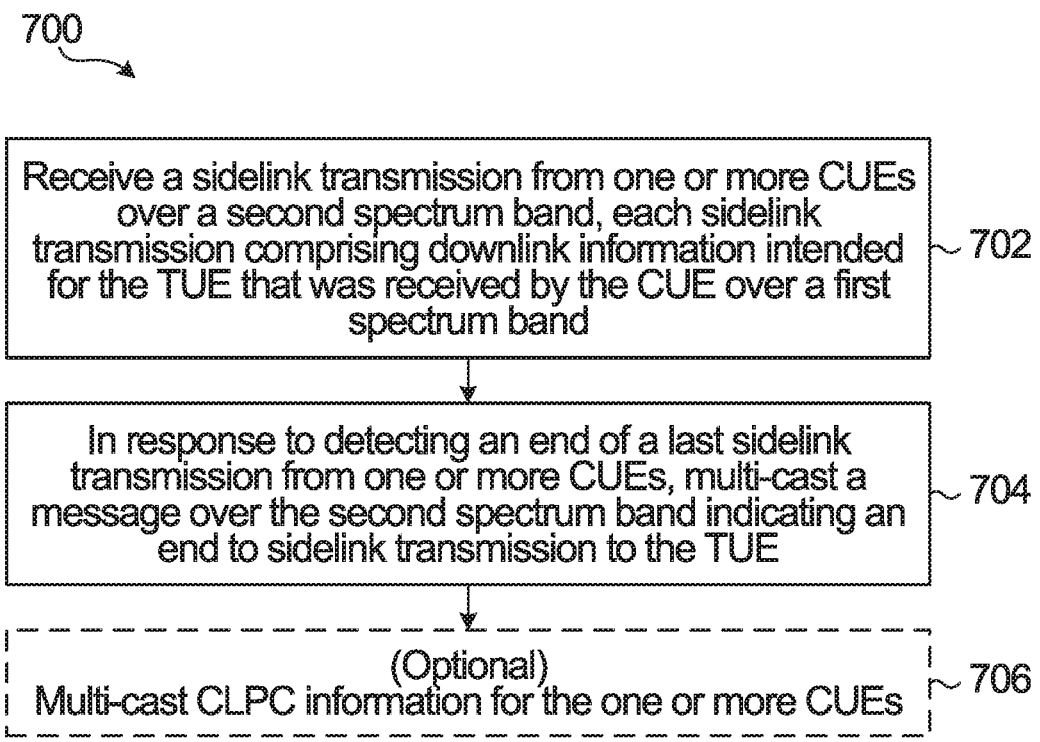
FIG. 7 is a flow diagram of examples operations in a UE operating as a TUE in a cooperating group of UEs in accordance with an embodiment of the present disclosure.

FIG. 7 illustrates a flow diagram of example operations 700 in a UE operating in a target mode as a TUE in a cooperating group of UEs in accordance with an embodiment of the present disclosure.

In block 702, the TUE receives a sidelink transmission from one or more CUEs over a second spectrum band, each sidelink transmission comprising downlink information intended for the TUE that was received by the CUE over a first spectrum band.

In block 704, in response to detecting an end of a last sidelink transmission from one or more CUEs, the TUE multi-casts a message over the second spectrum band indicating an end to sidelink transmission to the TUE.

In block 706, the TUE multi-casts CLPC information for the one or more CUEs over the second spectrum band. This may involve, for example, multi-casting a CLPC message appended to the multi-cast message indicating an end to sidelink transmission to the TUE.

The example operations 700 are illustrative of an example embodiment. Various ways to perform the illustrated operations, as well as examples of other operations that may be performed, are described herein. Further variations may be or become apparent.

Figure 8:
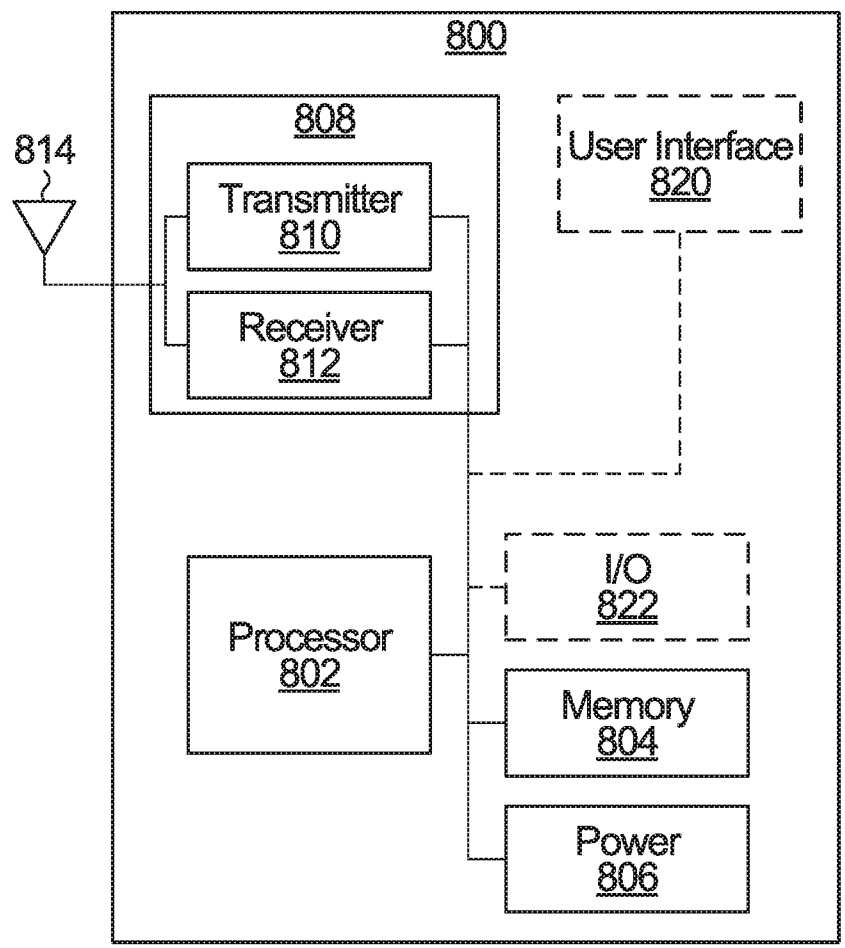
FIG. 8 is a block diagram of a UE according to an embodiment of the present disclosure.

FIG. 8 shows one embodiment of a UE 800 for implementing methods described herein. The UE 800 may include a processor 802, a memory 804, a power source 806 and a wireless communications interface 808 for sending and receiving data in a communications network, such as the network 100 shown in FIG. 1, which components may or may not be arranged as shown in FIG. 8. The wireless communications interface 808 includes a transmitter 810 and a receiver 812 coupled to an antenna 814. The wireless communications interface 808 is configured to communicate with network TPs over a first licensed spectrum band and to communicate with other UEs via D2D sidelink communications over a second unlicensed spectrum band as described herein. It will be appreciated that the functions of the wireless communications interface 808 may be carried out by different transceiver or modem components including multiple transmitter, receiver, digital signal processor (DSP) and antenna components or arrays. In one embodiment, the UE 800 includes a user interface 820 and various inputs/outputs (I/O) 822 such as a display, audio input, audio output, keypads, buttons, microphones or other inputs or outputs. The memory 804 may store programming and/or instructions for the processor 802 including instructions for sending, receiving, processing and supporting different services and types of data, such as but not limited to video, VoIP calls, web browsing data, email and other text communications.

Figure 9:
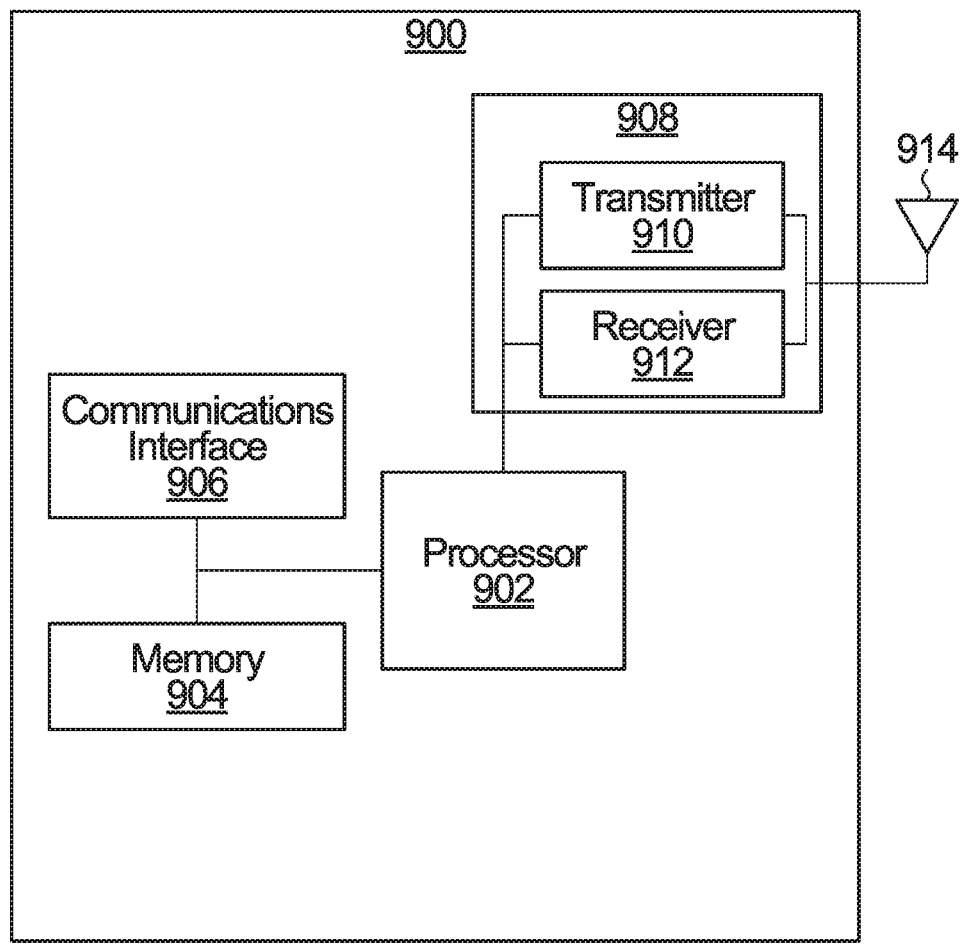
FIG. 9 is a block diagram of a network device according to an embodiment of the present disclosure.

FIG. 9 illustrates a network device 900 according to an embodiment of the present application. The network device 900 may comprise a processor 902, a memory 904, one or more communications interfaces 906, 908. The communications interface 906 may be a wired or wireless interface for sending and receiving data to a backhaul network or to other network nodes, gateways or relays in a network, such as the network 100 shown in FIG. 1. The wireless communications interface 908 is configured to send and receive data with one or more UEs, including transmitting polling messages requesting NDD feedback from candidate UEs, receiving NDD feedback from the candidate UEs, transmitting group-specific CPC messages to cooperating groups of UEs, and transmitting downlink information intended for TUEs in the cooperating groups of UEs, as described previously. It will be appreciated that the functions of the wireless communications interface 908 may be carried out by different transceiver or modem components including multiple transmitter, receiver and antenna components or arrays. The memory 904 may store programming and/or instructions for the processor 902, including instructions for sending and receiving data to and from a UE.

Some embodiments are configured to satisfy various constraints or regulations affecting D2D sidelink transmission format. In a specific example, from ETSI EN 301 893 V.1.7.1 (2012-06), the following requirements apply to any unlicensed spectrum transmissions in the 5 GHz band:

The nominal channel bandwidth shall be at least 5 MHz at all times. The nominal channel bandwidth is the widest band of frequencies, inclusive of guard bands, assigned to a single channel.

The occupied channel bandwidth shall be between 80% and 100% of the declared nominal channel bandwidth. In case of smart antenna systems (devices with multiple transmit chains) each of the transmit chains shall meet this requirement. The occupied channel bandwidth is the bandwidth containing 99% of the power of the signal.

A power constraint and per MHz power spectral density (PSD) constraint requires that a signal which occupies a small portion of the nominal bandwidth cannot be transmitted at the maximum transmission power available at the UE due to the PSD constraint.

The constraints or regulations in place for a given application may have an effect on the specifics of implementation. Examples of how these constraints may be applied are given below. However, it should be understood that the bandwidth and power constraints are specific examples. The methods and systems described herein can be adapted to different contexts in which such constraints are not in place, or in which differing constraints are in place.

In some embodiments, sidelink transmissions are maintained orthogonal to other in-group sidelink synchronous transmissions in the frequency-domain, e.g., via interleaved-frequency division multiple access (I-FDMA) or resource block (RB) multi-clustering, or in the code-domain, e.g., via code division multiple access (CDMA). In other embodiments, sidelink transmissions are spread across a channel BW using a non-orthogonal multiple access scheme, such as low density spreading (LDS), non-orthogonal multiple access, or sparse code multiple access (SCMA).

I-FDMA is a special case of distributed-FDMA (D-FDMA) where the mapped sub-carriers span the whole bandwidth for a given channel; i.e., $N=Q*M$, where Q is the equidistance factor between the mapped subcarriers, N is the total number of subcarriers, and M is the number of sub-carriers allocated to one UE. I-FDMA has lower PAPR compared to single carrier-FDMA (SC-FDMA) and D-FDMA because its modulated time domain symbols are simply a repetition of the original input symbols. One advantage of I-FDMA over D-FDMA and SC-FDMA is the lower complexity at the transmitter side because the modulated symbols can be generated strictly in the time domain, without a need for DFT/IDFT at the transmitter.

RB multi-clustering, also called RB-Interleaved FDMA (RB-I-FDMA) or Clustered DFT-Spread OFDM, is a multi-cluster version of SC-FDMA in which multiple non-contiguous resource clusters are allocated to a single UE within a single carrier. In some embodiments, a simplified version of clustered DFT-Spread OFDM with up to 2 non-contiguous cluster resource allocations per UE is employed. The PAPR of Clustered-DFT-Spread OFDM is slightly worse than that of SC-FDMA. Depending on the size of the each cluster, filtering can be applied to clustered DFT-Spread OFDM.

In some embodiments, an RB multi-clustering system is designed such that each UE occupies at least one RB per MHz of spectrum. This permits the UE to transmit at full power and spread its signal across the whole carrier in order to fulfill the 80% bandwidth occupancy requirement and per MHz PSD constraint that may be imposed in the unlicensed spectrum.

If the UE resource allocation is not spread over a large enough bandwidth, then a UE may not be able to use its full power to transmit because of the per MHz power spectral density constraint in the unlicensed spectrum.

Transmitting with more power results in a larger coverage area and therefore reaching the TUEs and also silencing more potential interferers because they would sense the channel is busy. The I-FDMA and RB multi-clustering waveforms described above may be more suitable for UE cooperation in the unlicensed spectrum than conventional SC-FDMA waveforms. They feature better UE multiplexing capability in the frequency domain, and allow conformance with 80% bandwidth occupancy requirements and per MHz PSD constraints in the unlicensed spectrum.

A disadvantage of I-FDMA interleaved waveforms is that they cannot be used in conjunction with sub-band filtering and therefore cannot benefit from better protection against inter-carrier interference (ICI) provided by sub-band filtering.

RB multi-clustering allows meeting the bandwidth occupancy requirements and power density constraints that may be imposed in the unlicensed spectrum, and can be used in conjunction with filtering to allow more robustness against inter-carrier interference (ICI) as well as carrier frequency offset (CFO) mismatch between CUEs and TUE. Disadvantages of RB multi-clustering include the relatively higher PAPR compared to I-FDMA and the added complexity at the terminal side given that multiple sub-band filters need to be used. Also, due to the frequency localization of the sub-band filters which are typically quite small (one RB or a couple of RBs), filtering performance can be degraded.

In some embodiments, a group-based flexible nominal bandwidth configuration is combined with a filtered version of RB multi-clustering in order to leverage the benefits of both approaches. The group-based flexible nominal bandwidth configuration allows multiplexing different Hyper UEs across adjacent nominal channel bandwidths without co-channel interference between different Hyper UEs. The Filtered-Interleaved waveform (RB-level interleaving) allows multiplexing different CUEs within the same nominal channel bandwidth while meeting bandwidth occupancy requirements and PSD constraints that may be imposed in unlicensed spectrum.

Embodiments of the present disclosure may improve the efficiency of sidelink CCA when multiple CUEs are selected for cooperation.

Embodiments of the present disclosure may also improve coexistence fairness with existing technologies that may be operating in unlicensed spectrum, such as WLAN. For example, determining the CCA starting point based on earliest subframe alignment in accordance with one aspect of the present disclosure, rather than immediately after an unlicensed spectrum channel becomes idle, may give coexisting WLAN nodes an advantage that is balanced by the aggressive nature of the ED-based only SL LBT process that may be employed in some embodiments of the present disclosure.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

EXAMPLE EMBODIMENTS

The following provides a non-limiting list of example embodiments of the present disclosure:

Example 1

A method in a network node of a wireless communication network, the method comprising:
for a cooperating group of user equipments (UEs), transmitting a group-specific common-parameters configuration (CPC) message to at least one transmit point (TP) for transmission, over a first spectrum band, to at least a subset of the cooperating UEs in the group, the group-specific CPC message comprising information to configure cooperating UEs in the group to generate a common contention window for synchronous clear channel assessment and aligned sidelink transmission starting times in a second spectrum band.

Example 2

The method of Example 1, wherein the first spectrum band is a licensed spectrum band and the second spectrum band is an unlicensed spectrum band.

Example 3

The method of Example 1, wherein the at least one TP comprises a plurality of TPs, each TP of the plurality serving a respective subset of the cooperating UEs in the group.

Example 4

The method of Example 3, wherein at least one of the cooperating UEs is included in more than one of the respective subsets.

Example 5

The method of Example 1, wherein transmitting a group-specific CPC message to at least one TP comprises transmitting the group-specific CPC message to each TP over a respective backhaul connection to the TP.

Example 6

The method of Example 1, wherein the information to configure cooperating UEs in the group to generate a common contention window comprises a group-specific common seed value to initialize a random number generator used by each cooperating UE in the group for generating the common contention window.

Example 7

The method of Example 6, wherein the common seed value is a cooperating group identifier (ID) associated with the group or a UE ID associated with a UE that is designated as a target UE (TUE) of the group.

Example 8

The method of Example 1, wherein the cooperating group of UEs comprises at least:
a target UE (TUE); and
at least one cooperating UE (CUE) configured to relay traffic, received over the first spectrum band and intended for the TUE, to the TUE via device-to-device (D2D) sidelink transmission in the second spectrum band.

Example 9

The method of Example 1, further comprising forming the cooperating group of UEs based at least in part on nominal decoding delay (NDD) feedback from a plurality of candidate UEs.

Example 10

The method of Example 9, further comprising transmitting a message to the at least one TP to cause the at least one TP to transmit a polling message, over the first spectrum band, to the candidate UEs, the polling message requesting the NDD feedback.

Example 11

The method of Example 8, wherein the CPC message further comprises information indicating a time offset, $T_{offset}$, for the cooperating UEs to apply from the end of a source TP's transmission to determine a group listen-before-talk (LBT) initialization instant, $t_0$.

Example 12

The method of Example 11, wherein $T_{offset}$ is greater than a maximum nominal decoding delay of the cooperating UEs in the group that are selected to relay traffic from the source TP.

Example 13

The method of Example 8, wherein the CPC message further comprises information indicating a maximum number of device-to-device (D2D) sidelink (SL) retransmissions, $N_{SL-reTx}$, in the second spectrum band.

Example 14

The method of Example 8, wherein the CPC message further comprises information indicating a priority class index associated with a traffic flow to be relayed to the TUE over the second spectrum band.

Example 15

A method in a transmit point (TP) of a wireless communication network, the method comprising:
for a cooperating group of user equipments (UEs), transmitting, over a first spectrum band, a group-specific common-parameters configuration (CPC) message to at least a subset of the cooperating UEs in the group, the group-specific CPC message comprising information to configure cooperating UEs in the group to generate a common contention window for synchronous clear channel assessment and aligned sidelink transmission starting times in a second spectrum band.

Example 16

The method of Example 15, wherein the first spectrum band is a licensed spectrum band and the second spectrum band is an unlicensed spectrum band.

Example 17

The method of Example 15, further comprising receiving the group-specific CPC message from a network node over a backhaul connection, wherein transmitting the group-specific CPC message over the first spectrum band comprises encoding the group-specific CPC message received from the network node to generate an encoded group-specific CPC message and transmitting the encoded group-specific CPC message over the first spectrum band.

Example 18

The method of Example 17, wherein transmitting the encoded group-specific CPC message over the first spectrum band comprises transmitting the encoded group-specific CPC message within a downlink (DL) control transmission.

Example 19

The method of Example 15, wherein the information to configure cooperating UEs in the group to generate a common contention window comprises a group-specific common seed value to initialize a random number generator used by each cooperating UE in the group for generating the common contention window.

Example 20

The method of Example 19, wherein the common seed value is a cooperating group identifier (ID) associated with the group or a UE ID associated with a UE that is designated as a target UE (TUE) of the group.

Example 21

The method of Example 15, wherein the cooperating group of UEs comprises at least:
a target UE (TUE); and
at least one cooperating UE (CUE) configured to relay traffic, received over the first spectrum band and intended for the TUE, to the TUE via device-to-device (D2D) sidelink transmission in the second spectrum band.

Example 22

The method of Example 15, further comprising transmitting a polling message, over the first spectrum band, to a plurality of candidate UEs, the polling message requesting nominal decoding delay (NDD) feedback from the plurality of candidate UEs.

Example 23

The method of Example 22, further comprising:
receiving NDD feedback from at least a subset of the candidate UEs over the first spectrum band; and transmitting the NDD feedback to a network node over a backhaul connection.

Example 24

The method of Example 21, wherein the CPC message further comprises information indicating a time offset, $T_{offset}$, for the cooperating UEs to apply from the end of a transmission from the TP to determine a group listen-before-talk (LBT) initialization instant, $t_0$.

Example 25

The method of Example 23, wherein $T_{offset}$ is greater than a maximum nominal decoding delay of the cooperating UEs in the group that are selected to relay traffic from the TP.

Example 26

The method of Example 21, wherein the CPC message further comprises information indicating a maximum number of device-to-device (D2D) sidelink (SL) retransmissions, $N_{SL-reTx}$, in the second spectrum band.

Example 27

The method of Example 21, wherein the CPC message further comprises information indicating a priority class index associated with a traffic flow to be relayed to the TUE over the second spectrum band.

Example 28

A method in user equipment (UE), the method comprising:
in a cooperation mode, in which the UE acts a cooperating UE (CUE) in a cooperating group of UEs:
receiving a group-specific common-parameters configuration (CPC) message from a transmit point (TP) over a first spectrum band, the group-specific CPC message comprising information to configure cooperating UEs in the group for synchronous clear channel assessment (CCA) and aligned sidelink transmission starting times in a second spectrum band; and performing a synchronous CCA in the second spectrum band in accordance with a common contention window generated based on the information in the group-specific CPC message.

Example 29

The method of Example 28, wherein the first spectrum band is a licensed spectrum band and the second spectrum band is an unlicensed spectrum band.

Example 30

The method of Example 28 further comprising:
receiving a nominal decoding delay (NDD) polling message from the TP over the first spectrum band; and
transmitting NDD feedback in a response message to the TP over the first spectrum band.

Example 31

The method of Example 28, wherein:
the information to configure cooperating UEs in the group for synchronous CCA and aligned sidelink transmission starting times in the second spectrum band comprises a group-specific common seed value; and
the common contention window is generated using a random number generator initialized with the group-specific common seed value.

Example 32

The method of Example 31, wherein the information to configure cooperating UEs in the group for synchronous CCA and aligned sidelink transmission starting times in the second spectrum band further comprises information indicating a priority class index associated with a traffic flow targeted to a target UE (TUE) of the group, the method further comprising determining a minimum contention window size, $CW_{min}$, and a maximum contention window size, $CW_{max}$, for the common contention window based on the priority class index.

Example 33

The method of Example 32, wherein:
the information to configure cooperating UEs in the group for synchronous CCA and aligned sidelink transmission starting times in the second spectrum band further comprises information indicating a time offset, $T_{offset}$; and
the common contention window is generated by:
determining a group listen-before-talk (LBT) initialization instant, $t_0$, by applying $T_{offset}$ from the time of the end of a transmission from the TP;
at the group LBT initialization instant, $t_0$, using the random number generator that was initialized with the common seed value to generate a new uniform random number from the set $\{0, 1, \ldots, CW_{min}\}$ and setting a value of a backoff counter equal to the new uniform random number; and
setting the size of the common contention window based on the value of the backoff counter and a CCA slot duration.

Example 34

The method of Example 33, wherein setting the size of the common contention window based on the backoff counter and a CCA slot duration comprises setting the size of the common contention window according to:

$CW_{cs}$=Backoff Counter*$CCA$-Slot-Duration, where $CW_{cs}$ is the size of the common contention window, Backoff Counter is the value of the backoff counter and CCA-Slot-Duration is the CCA slot duration.

Example 35

The method of Example 33, further comprising determining an earliest start time, $t_s$, for a sidelink transmission over the second spectrum band based on the common CCA initialization instant, $t_0$.

Example 36

The method of Example 35, wherein to align the sidelink transmission over the second spectrum band with a transmission time unit (TTU) in the first spectrum band, the earliest start time, $t_s$, is determined according to:

$t_s$=floor$[(t_0+$DIFS$+CW_{cs}+T_s)/T_s]*T_s$, or $t_s$=ceil$[(t_0+$DIFS$+CW_{cs})/T_s]*T_s$, where floor[ ] is the floor function, ceil[ ] is the ceiling function, to is the common CCA initialization instant, DIFS is a Distributed Coordination Function Inter-Frame Space, $CW_{cs}$ is the size of the common contention window, and $T_s$ is the duration of a TTU in the first spectrum band.

Example 37

The method of Example 35, wherein performing a synchronous CCA in the second spectrum band in accordance with the common contention window comprises starting the synchronous CCA at a time $t_{CCA}$ according to:

$t_{CCA}=t_s-($DIFS$+CW_{cs})$, where $t_s$ is the earliest start time for a sidelink transmission over the second spectrum band, DIFS is a Distributed Coordination Function Inter-Frame Space, and $CW_{cs}$ is the size of the common contention window.

Example 38

The method of Example 33, further comprising:
in response to receiving a multi-cast message from the TUE indicating an end to sidelink transmission to the TUE:
determining a new group LBT initialization instant, $t_0$, as the time of the end of the multi-cast message from the TUE indicating an end to sidelink transmission to the TUE;
at the new group LBT initialization instant, $t_0$, using the random number generator that was initialized with the common seed value to generate a new uniform random number from the set $\{0, 1, \ldots, CW_{min}\}$ and setting a value of the backoff counter equal to the new uniform random number; and
setting the size of the common contention window based on the value of the backoff counter and the CCA slot duration.

Example 39

The method of Example 33, further comprising:
in response to receiving a multi-cast message from the TUE indicating an end to sidelink transmission to the TUE followed by a multi-cast message from the TUE comprising closed-loop power control (CLPC) information for the UE:
determining a new group LBT initialization instant, $t_0$, as the time of the end of the multi-cast message from the TUE comprising CLPC information for the UE;
at the new group LBT initialization instant, $t_0$, using the random number generator that was initialized with the common seed value to generate a new uniform random number from the set $\{0, 1, \ldots, CW_{min}\}$ and setting a value of the backoff counter equal to the new uniform random number; and
setting the size of the common contention window based on the value of the backoff counter and the CCA slot duration.

Example 40

The method of Example 39, further comprising adjusting transmit power of the UE based on the CLPC information received from the TUE.

Example 41

The method of Example 35, further comprising:
in response to a sidelink timeout interval, $T_{SL-timeout}$, expiring without receiving a message from the TUE indicating an end to sidelink transmission to the TUE:
determining a new group LBT initialization instant, $t_0$, as the time of the expiry of the sidelink timeout interval, $T_{SL-timeout}$;
at the new group LBT initialization instant, $t_0$, using the random number generator that was initialized with the common seed value to generate a new uniform random number from the set $\{0, 1, \ldots, CW\}$, where CW is greater than $CW_{min}$, and setting a value of the backoff counter equal to the new uniform random number; and
setting the size of the common contention window based on the value of the backoff counter and the CCA slot duration.

Example 42

The method of Example 41, wherein CW is double $CW_{min}$.

Example 43

The method of Example 28, wherein performing a synchronous CCA in the second spectrum band in accordance with the common contention window comprises performing an energy-detection (ED) based CCA using an ED threshold based on transmit power of the UE.

Example 44

The method of Example 28, further comprising:
receiving downlink information from the TP over the first spectrum band, the downlink information intended for a target UE (TUE) in the cooperating group of UEs; and
in response to the synchronous CCA in the second spectrum band indicating that a channel in the second spectrum band is available, transmitting at least a portion of the downlink information to the TUE over the channel in the second spectrum band.

Example 45

The method of Example 28, further comprising:
in a target mode, in which the UE acts as a target UE (TUE) in a cooperating group of UEs that includes the TUE and at least one cooperating UE (CUE):
in response to detecting an end of the last of at least one sidelink transmission from the at least one CUE over the second spectrum band, multi-casting a message over the second spectrum band to the group, the message indicating an end to sidelink transmission to the TUE.

Example 46

The method of Example 45, wherein the multi-cast message indicating an end to sidelink transmission to the TUE comprises symbols transmitted at a reference power level for sidelink channel measurement at the at least one CUE.

Example 47

The method of Example 45, wherein multi-casting a message over the second spectrum band to the group further comprises multi-casting closed-loop power control (CLPC) information for the at least one CUE.

Example 48

The method of Example 47, wherein the CLPC information for the at least one CUE comprises, for each CUE, a dynamic CLPC command indicating a signed power offset to be applied to the transmit power of the CUE.

Example 49

The method of Example 48, wherein each dynamic CLPC command comprises a code of at least two bits and there are more power decrement codes than power increment codes.

Example 50

The method of Example 47, wherein multi-casting closed-loop power control (CLPC) information for the at least one CUE comprises multi-casting the CLPC information in response to receiving, over the second spectrum band, at least one sidelink transmission associated with a given hybrid automatic repeat request (HARQ) process identifier (ID), the CLPC information for the at least one CUE comprising, for each CUE that is assisting with the given HARQ process ID and from which a sidelink transmission was not received, a dynamic CLPC command to decrease the CUE's transmit power.

Example 51

The method of Example 45, wherein multi-casting a message indicating an end to sidelink transmission to the TUE comprises multi-casting the message before decoding of the at least one detected sidelink transmission is complete.

Example 52

A network device comprising:
a wireless interface;
a processor operatively coupled to the wireless interface; and
a computer readable storage medium operatively coupled to the processor, the computer readable storage medium storing programming for execution by the processor, the programming comprising instructions to:
transmit, via the wireless interface, a group-specific common-parameters configuration (CPC) message over a first spectrum band to a cooperating group of user equipments (UEs), the group-specific CPC message comprising information to configure cooperating UEs in the group to generate a common contention window for synchronous clear channel assessment and aligned sidelink transmission starting times in a second spectrum band.

Example 53

The network device of Example 52, wherein the first spectrum band is a licensed spectrum band and the second spectrum band is an unlicensed spectrum band.

Example 54

The network device of Example 52, wherein the information to configure cooperating UEs in the group to generate a common contention window comprises a group-specific common seed value to initialize a random number generator used by each cooperating UE in the group for generating the common contention window.

Example 55

The network device of Example 52, wherein the cooperating group of UEs comprises at least:
a target UE (TUE); and
at least one cooperating UE (CUE) configured to relay traffic, received over the first spectrum band and intended for the TUE, to the TUE via device-to-device (D2D) sidelink transmission in the second spectrum band.

Example 56

The network device of Example 52, wherein the instructions further comprise instructions to transmit, via the wireless interface, a polling message over the first spectrum band to a plurality of candidate UEs, the polling message requesting nominal decoding delay (NDD) feedback from the plurality of candidate UEs.

Example 57

The network device of Example 56, further comprising a communications interface configured to communicate over a backhaul connection, wherein the instructions further comprise instructions to:
receive, via the wireless interface, NDD feedback from at least a subset of the candidate UEs over the first spectrum band; and
transmit, via the communications interface, the NDD feedback to a network node over the backhaul connection.

Example 58

The network device of Example 55, wherein the CPC message further comprises information indicating a time offset, $T_{offset}$, for the cooperating UEs to apply from the end of a transmission from the TP to determine a group listen-before-talk (LBT) initialization instant, $t_0$.

Example 59

The network device of Example 58, wherein $T_{offset}$ is greater than a maximum nominal decoding delay of the cooperating UEs in the group that are selected to relay traffic from the TP.

Example 60

A user equipment (UE) comprising:
a wireless interface;
a processor operatively coupled to the wireless interface; and
a computer readable storage medium operatively coupled to the processor, the computer readable storage medium storing programming for execution by the processor, the programming comprising instructions for operating in a cooperation mode, in which the UE acts as a cooperating UE (CUE) in a cooperating group of UEs, the cooperation mode comprising:
receiving a group-specific common-parameters configuration (CPC) message from a transmit point (TP) over a first spectrum band, the group-specific CPC message comprising information to configure cooperating UEs in the group for synchronous clear channel assessment (CCA) and aligned sidelink transmission starting times in a second spectrum band; and
performing a synchronous CCA in the second spectrum band in accordance with a common contention window generated based on the information in the group-specific CPC message.

Example 61

The UE of Example 60, wherein the first spectrum band is a licensed spectrum band and the second spectrum band is an unlicensed spectrum band.

Example 62

The UE of Example 60, wherein operating in the cooperation mode further comprises:
receiving a nominal decoding delay (NDD) polling message from the TP over the first spectrum band; and
transmitting NDD feedback in a response message to the TP over the first spectrum band.

Example 63

The UE of Example 60, wherein:
the information to configure cooperating UEs in the group for synchronous CCA and aligned sidelink transmission starting times in the second spectrum band comprises a group-specific common seed value; and
the common contention window is generated using a random number generator initialized with the group-specific common seed value.

Example 64

The UE of Example 63, wherein:
the information to configure cooperating UEs in the group for synchronous CCA and aligned sidelink transmission starting times in the second spectrum band further comprises information indicating a priority class index associated with a traffic flow targeted to a target UE (TUE) of the group; and
performing a synchronous CCA in the second spectrum band comprise determining a minimum contention window size, $CW_{min}$, and a maximum contention window size, $CW_{max}$, for the common contention window based on the priority class index.

Example 65

The UE of Example 64, wherein:
the information to configure cooperating UEs in the group for synchronous CCA in the second spectrum band further comprises information indicating a time offset, $T_{offset}$; and
the common contention window is generated by:
determining a group listen-before-talk (LBT) initialization instant, $t_0$, by applying $T_{offset}$ from the time of the end of a transmission from the TP;
at the group LBT initialization instant, $t_0$, using the random number generator that was initialized with the common seed value to generate a new uniform random number from the set $\{0, 1, \ldots, CW_{min}\}$ and setting a value of a backoff counter equal to the new uniform random number; and setting the size of the common contention window based on the value of the backoff counter and a CCA slot duration.

Example 66

The UE of Example 65, wherein setting the size of the common contention window based on the backoff counter and a CCA slot duration comprise setting the size of the common contention window according to:

$CW_{cs}$=Backoff Counter*$CCA$-Slot-Duration, where $CW_{cs}$ is the size of the common contention window, Backoff Counter is the value of the backoff counter and CCA-Slot-Duration is the CCA slot duration.

Example 67

The UE of Example 65, wherein operating in the cooperation mode further comprises determining an earliest start time, $t_s$, for a sidelink transmission over the second spectrum band based on the common CCA initialization instant, $t_0$.

Example 68

The UE of Example 67, wherein to align the sidelink transmission over the second spectrum band with a transmission time unit (TTU) in the first spectrum band, the earliest start time, $t_s$, is determined according to:

$t_s$=floor[$(t_0$+DIFS+$CW_{cs}$+$T_s)/T_s$]*$T_s$, or $t_s$=ceil[$(t_0$+DIFS+$CW_{cs})/T_s$]*$T_s$, where floor[ ] is the floor function, ceil[ ] is the ceiling function, to is the common CCA initialization instant, DIFS is a Distributed Coordination Function Inter-Frame Space, $CW_{cs}$ is the size of the common contention window, and $T_s$ is the duration of a TTU in the first spectrum band.

Example 69

The UE of Example 67, wherein performing a synchronous CCA in the second spectrum band in accordance with the common contention window comprise starting the synchronous CCA at a time $t_{CCA}$ according to:

$t_{CCA}$=$t_s$−(DIFS+$CW_{cs}$), where $t_s$ is the earliest start time for a sidelink transmission over the second spectrum band, DIFS is a Distributed Coordination Function Inter-Frame Space, and $CW_{cs}$ is the size of the common contention window.

Example 70

The UE of Example 65, wherein operating in the cooperation mode further comprises:
in response to receiving a multi-cast message from the TUE indicating an end to sidelink transmission to the TUE:
 determining a new group LBT initialization instant, $t_0$, as the time of the end of the multi-cast message from the TUE indicating an end to sidelink transmission to the TUE;
 at the new group LBT initialization instant, $t_0$, using the random number generator that was initialized with the common seed value to generate a new uniform random number from the set $\{0, 1, \ldots, CW_{min}\}$ and setting a value of the backoff counter equal to the new uniform random number; and
 setting the size of the common contention window based on the value of the backoff counter and the CCA slot duration.

Example 71

The UE of Example 65, wherein operating in the cooperation mode further comprises:
in response to receiving a multi-cast message from the TUE indicating an end to sidelink transmission to the TUE followed by a multi-cast message from the TUE comprising closed-loop power control (CLPC) information for the UE:
 determining a new group LBT initialization instant, $t_0$, as the time of the end of the multi-cast message from the TUE comprising CLPC information for the UE;
 at the new group LBT initialization instant, $t_0$, using the random number generator that was initialized with the common seed value to generate a new uniform random number from the set $\{0, 1, \ldots, CW_{min}\}$ and setting a value of the backoff counter equal to the new uniform random number; and
 setting the size of the common contention window based on the value of the backoff counter and the CCA slot duration.

Example 72

The UE of Example 67, wherein operating in the cooperation mode further comprises:
in response to a sidelink timeout interval, $T_{SL\text{-}timeout}$, expiring without receiving a message from the TUE indicating an end to sidelink transmission to the TUE:
 determining a new group LBT initialization instant, $t_0$, as the time of the expiry of the sidelink timeout interval, $T_{SL\text{-}timeout}$;
 at the new group LBT initialization instant, $t_0$, using the random number generator that was initialized with the common seed value to generate a new uniform random number from the set $\{0, 1, \ldots, CW\}$, where CW is greater than $CW_{min}$, and setting a value of the backoff counter equal to the new uniform random number; and
 setting the size of the common contention window based on the value of the backoff counter and the CCA slot duration.

Example 73

The UE of Example 60, wherein operating in the cooperation mode further comprises:
receiving downlink information from the TP over the first spectrum band, the downlink information intended for a target UE (TUE) in the cooperating group of UEs; and
in response to the synchronous CCA in the second spectrum band indicating that a channel in the second spectrum band is available, transmit at least a portion of the downlink information to the TUE over the channel in the second spectrum band.

Example 74

The UE of Example 60, wherein the programming further comprises instructions for operating in a target mode, in which the UE acts as a target UE (TUE) in a cooperating group of UEs that includes the TUE and at least one cooperating UE (CUE), the target mode comprising:
    detecting an end of the last of at least one sidelink transmission from the at least one CUE over the second spectrum band; and
    in response to detecting the end of the last sidelink transmission, multi-casting a message over the second spectrum band to the group to indicate an end to sidelink transmission to the TUE.

Example 75

The UE of Example 74, wherein the multi-cast message comprises symbols transmitted at a reference power level for sidelink channel measurement at the at least one CUE.

Example 76

The UE of Example 74, wherein operating in the target mode further comprises multi-casting closed-loop power control (CLPC) information for the at least one CUE in response to detecting the end of the last sidelink transmission.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A method performed by a user equipment (UE) for UE cooperation, the method comprising:
    receiving group-specific information to configure cooperating UEs in a cooperating group of UEs for synchronous clear channel assessment (CCA) and aligned sidelink transmission starting times; and
    performing a synchronous CCA in accordance with a group common contention window, the group common contention window being generated based on the group-specific information.

2. The method of claim 1, wherein:
    the group-specific information is received over a first spectrum band; and
    the synchronous CCA is performed in a second spectrum band in accordance with the group common contention window based on the group-specific information.

3. The method of claim 2, wherein the first spectrum band is a licensed spectrum band and the second spectrum band is an unlicensed spectrum band.

4. The method of claim 2, wherein:
    the UE uses a first air interface to communicate via access link communications with transmit points (TPs) of a radio access network (RAN) over the first spectrum band; and
    the UE uses a second air interface to communicate via sidelink communications with UEs of the cooperating group of UEs over the second spectrum band.

5. The method of claim 4, wherein the first air interface and the second air interface use different radio access technologies (RATs).

6. The method of claim 1, wherein the second spectrum band overlaps a spectrum band in which WiFi enabled devices operate, and wherein sidelink communications over the second spectrum band utilize a 20 MHz channel structure common to WiFi communications to facilitate coexistence.

7. The method of claim 1, wherein:
    the group-specific information comprises a group-specific common seed value; and
    the group common contention window is generated using a random number generator initialized with the group-specific common seed value.

8. The method of claim 7, wherein the group-specific common seed value is derived from a group identifier associated with the group.

9. The method of claim 8, wherein the group-specific common seed value is derived from a UE identifier associated with a target UE (TUE) in the group.

10. The method of claim 7, wherein:
    the group-specific information to configure cooperating UEs in the group for synchronous CCA further comprises information indicating a time offset, $T_{offset}$; and
    the group common contention window is generated by:
    determining a group listen-before-talk (LBT) initialization instant, $t_0$, by applying $T_{offset}$ from the time of the end of a transmission from the TP;
    at the group LBT initialization instant, $t_0$, using the random number generator that was initialized with the common seed value to generate a new random number and setting a value of a backoff counter equal to the new random number; and
    setting a size of the group common contention window based on the value of the backoff counter and a CCA slot duration.

11. The method of claim 1, wherein:
    the cooperating group of UEs is a first cooperating group of UEs;
    the UE operates in a cooperation mode as a cooperating UE (CUE) serving a target UE (TUE) in the first cooperating group of UEs; and
    the UE operates in a target mode as a TUE served by at least one CUE in a second cooperating group of UEs.

12. The method of claim 1, wherein:
    the UE operates in a cooperation mode as a cooperating UE (CUE) serving a target UE (TUE) in the cooperating group of UEs, wherein the UE receives data for the TUE over a first access link with a radio access network (RAN); and
    the UE receives data for itself from the RAN over a second access link with the RAN, wherein the first access link utilizes time-frequency resources that are orthogonal or semi-orthogonal to time-frequency resources utilized by the second access link.

13. The method of claim 1, wherein the UE's role as a cooperating UE (CUE) or a target UE (TUE) in the cooperating group of UEs is assigned semi-statically.

14. The method of claim 1, wherein:
    the UE operates in a cooperation mode as a cooperating UE (CUE) serving a target UE (TUE) in the cooperating group of UEs;
    the UE receives data for the TUE from a plurality of transmit points (TPs) of a radio access network (RAN);
    the synchronous CCA finds a channel to be idle; and
    following the synchronous CCA that finds the channel to be idle, the UE forwards at least a portion of the data for the TUE to the TUE via a sidelink transmission over the channel, wherein data for the TUE that is received by the UE from different TPs is either augmented in a payload in the sidelink transmission or multiplexed in the frequency or time domains in the sidelink transmission.

15. The method of claim 1, wherein the synchronous CCA finds a channel to be busy, the method further comprising:

following the synchronous CCA that finds the channel to be busy, repeating the synchronous CCA one or more times until either the channel is found to be idle or a message is detected that indicates an end to sidelink transmission to the TUE.

16. The method of claim 1, wherein the group-specific information further comprises information indicating a maximum number of device-to-device (D2D) sidelink (SL) retransmissions.

17. The method of claim 1, further comprising:
receiving a multi-cast message from a target UE (TUE) indicating an end to sidelink transmission to the TUE, the multi-cast message comprising symbols transmitted at a reference power level; and
determining at least one sidelink channel measurement based on the detected multi-cast message.

18. The method of claim 1, wherein:
the UE operates in a target mode as a target UE (TUE) served by at least one cooperating UE (CUE) in the cooperating group of UEs; and
in response to detecting an end of the last of at least one sidelink transmission from the at least one CUE of the cooperating group of UEs, multi-casting a sidelink message to the cooperating group of UEs after a duration of a short inter-frame space (SIFS) following detecting the end of the last sidelink transmission, the sidelink message indicating an end to sidelink transmission to the TUE.

19. The method of claim 1, wherein:
the UE operates in a target mode as a target UE (TUE) served by at least one cooperating UE (CUE) in the cooperating group of UEs; and
the UE employs a Hybrid Automatic Repeat request (HARQ) process comprising:
merging a licensed HARQ revision for a transmission received over a licensed access link from a transmit point (TP) of a radio access network (RAN) with an unlicensed HARQ revision for an unlicensed sidelink transmission received from a CUE in the cooperating group.

20. A method performed by a network node of a wireless communication network, the method comprising:
for a cooperating group of user equipments (UEs), transmitting group-specific information to at least one transmit point (TP) for transmission to at least a subset of the cooperating UEs in the group, the group-specific information comprising information to configure cooperating UEs in the group to generate a group common contention window for synchronous clear channel assessment (CCA) and aligned sidelink transmission starting times.

21. The method of claim 20, wherein:
the group-specific information is transmitted to the at least one TP for transmission over a first spectrum band; and
the group common contention window is for synchronous CCA and aligned sidelink transmission starting times in a second spectrum band.

22. The method of claim 21, wherein the first spectrum band is a licensed spectrum band and the second spectrum band is an unlicensed spectrum band.

23. The method of claim 21, wherein the cooperating group of UEs comprises at least:
a target UE (TUE); and
at least one cooperating UE (CUE) configured to relay traffic, received over the first spectrum band and intended for the TUE, to the TUE via device-to-device (D2D) sidelink transmission in the second spectrum band.

24. The method of claim 23, wherein the at least one TP comprises a plurality of TPs, each TP of the plurality serving a respective subset of the cooperating UEs in the group.

25. The method of claim 24, wherein at least one of the cooperating UEs is included in more than one of the respective subsets.

26. The method of claim 24, wherein the respective subset of the cooperating UEs in the group served by a given TP is preselected based on channel quality indicator (CQI) feedback from the TUE and the TUE's best CUE(s) with the given TP.

27. The method of claim 20, wherein the information to configure cooperating UEs in the group to generate a group common contention window comprises a group-specific common seed value to initialize a random number generator used by each cooperating UE in the group for generating the group common contention window.

28. The method of claim 27, wherein the common seed value is derived from a cooperating group identifier (ID) associated with the group or a UE ID associated with a UE that is designated as a target UE (TUE) of the group.

29. The method of claim 20, wherein the group-specific information further comprises information indicating a maximum number of device-to-device (D2D) sidelink (SL) retransmissions.

30. A user equipment comprising:
at least one processor; and
a computer readable storage medium operatively coupled to the at least one processor, the computer readable storage medium storing programming for execution by the at least one processor, the programming comprising instructions to:
receive group-specific information to configure cooperating user equipments (UEs) in a cooperating group of UEs for synchronous clear channel assessment (CCA) and aligned sidelink transmission starting times; and
perform a synchronous CCA in accordance with a group common contention window, the group common contention window being generated based on the group-specific information.

31. A non-transitory computer readable storage medium storing programming for execution by at least one processor of a user equipment, the programming comprising instructions to:
receive group-specific information to configure cooperating UEs in a cooperating group of UEs for synchronous clear channel assessment (CCA) and aligned sidelink transmission starting times; and
perform a synchronous CCA in accordance with a group common contention window, the group common contention window being generated based on the group-specific information.

32. A network node comprising:
at least one processor; and
a computer readable storage medium operatively coupled to the at least one processor, the computer readable storage medium storing programming for execution by the at least one processor, the programming comprising instructions to:
transmit, for a cooperating group of user equipments (UEs), group-specific information to at least one transmit point (TP) for transmission to at least a subset of the cooperating UEs in the group, the group-specific information comprising information to configure cooperating UEs in the group to generate a group common contention window for synchronous clear channel assessment (CCA) and aligned sidelink transmission starting times.

33. A non-transitory computer readable storage medium storing programming for execution by at least one processor of a network node, the programming comprising instructions to:

transmit, for a cooperating group of user equipments (UEs), group-specific information to at least one transmit point (TP) for transmission to at least a subset of the cooperating UEs in the group, the group-specific information comprising information to configure cooperating UEs in the group to generate a group common contention window for synchronous clear channel assessment (CCA) and aligned sidelink transmission starting times.

* * * * *